United States Patent
Sharrah et al.

(10) Patent No.: US 10,215,331 B2
(45) Date of Patent: Feb. 26, 2019

(54) PORTABLE LIGHT HAVING A DEPLOYABLE POLE AND LATCH ARRANGEMENT THEREFOR

(71) Applicant: Streamlight, Inc., Eagleville, PA (US)

(72) Inventors: Raymond L. Sharrah, Collegeville, PA (US); Jonathan R. Sharrah, Phoenixville, PA (US)

(73) Assignee: Streamlight, Inc., Eagleville, PA (US)

( * ) Notice: Subject to any disclaimer, the term of this patent is extended or adjusted under 35 U.S.C. 154(b) by 0 days.

(21) Appl. No.: 15/803,109

(22) Filed: Nov. 3, 2017

(65) Prior Publication Data
US 2018/0051848 A1 Feb. 22, 2018

Related U.S. Application Data

(62) Division of application No. 14/592,450, filed on Jan. 8, 2015, now Pat. No. 9,816,661.
(Continued)

(51) Int. Cl.
*F16M 11/28* (2006.01)
*F21L 4/00* (2006.01)
(Continued)

(52) U.S. Cl.
CPC ............... *F16M 11/28* (2013.01); *F21L 4/00* (2013.01); *F21S 9/02* (2013.01); *F21V 21/06* (2013.01);
(Continued)

(58) Field of Classification Search
CPC .......... F21L 4/04; F21V 21/145; F21V 21/22; F21V 21/06; F16M 11/28; F16M 11/30; F16M 2200/08
See application file for complete search history.

(56) References Cited

U.S. PATENT DOCUMENTS 2,611,571 A 9/1952 Breakiron
4,648,697 A 3/1987 Kawazoe
(Continued)

FOREIGN PATENT DOCUMENTS

CA 2622506 11/2009
EP 1880692 1/2008
(Continued)

OTHER PUBLICATIONS

Patent Cooperation Treaty, "Notification of Transmittal of the International Search Report and the Written Opinion of the International Searching Authority for International Application No. PCT/US15/10634", dated Apr. 10, 2015, 9 pages.
(Continued)

*Primary Examiner* — Robert J May
(74) *Attorney, Agent, or Firm* — Clement A. Berard, Esq.; Dann, Dorfman, Herrell & Skillman, PC

(57) ABSTRACT

A portable light includes a base having a deployable pole pivotably supported on the base, and a light source supported on the deployable pole. A latch is configured to retain the deployable pole in a deployed position and to release the deployable pole from the deployed position at which it is retained. The latch includes a latch plate that is biased to move toward the deployable pole to engage a base end thereof when the deployable pole is in the deployed position and that is movable to release the deployable pole.

20 Claims, 33 Drawing Sheets

Related U.S. Application Data

(60) Provisional application No. 61/925,388, filed on Jan. 9, 2014.

(51) Int. Cl.

| | | |
|---|---|---|
| *F21V 21/22* | (2006.01) | |
| *F21V 23/00* | (2015.01) | |
| *F21V 21/40* | (2006.01) | |
| *F21S 9/02* | (2006.01) | |
| *F21V 21/06* | (2006.01) | |
| *F21V 23/06* | (2006.01) | |
| *F21W 111/10* | (2006.01) | |
| *F21W 131/10* | (2006.01) | |
| *F21Y 115/10* | (2016.01) | |

(52) U.S. Cl.
CPC .......... *F21V 21/22* (2013.01); *F21V 21/406* (2013.01); *F21V 23/002* (2013.01); *F16M 2200/08* (2013.01); *F21V 23/06* (2013.01); *F21W 2111/10* (2013.01); *F21W 2131/1005* (2013.01); *F21Y 2115/10* (2016.08)

(56) References Cited

U.S. PATENT DOCUMENTS

| | | | |
|---|---|---|---|
| 5,012,394 A | 4/1991 | Woodward | |
| 6,260,985 B1 | 7/2001 | Zeller | |
| 6,474,837 B1 | 11/2002 | Belliveau | |
| 7,470,036 B2 | 12/2008 | Deighton | |
| 7,484,858 B2 | 2/2009 | Deighton | |
| 8,599,097 B2 * | 12/2013 | Intravatola | F16M 11/28 206/573 |
| 9,103,495 B2 | 8/2015 | Intravatola | |
| 9,163,823 B2 | 10/2015 | Choksi | |
| 9,470,382 B1 | 10/2016 | Sharrah et al. | |
| 9,816,661 B2 | 11/2017 | Sharrah et al. | |
| 2003/0103357 A1 | 6/2003 | Drake et al. | |
| 2006/0028812 A1 | 2/2006 | Yuen | |
| 2006/0198133 A1 | 9/2006 | Mah | |
| 2009/0027876 A1 | 1/2009 | Yu | |
| 2009/0284963 A1 | 11/2009 | Intravatola | |
| 2011/0121727 A1 | 5/2011 | Sharrah et al. | |
| 2011/0157882 A1 | 6/2011 | Wessel | |
| 2012/0261530 A1 | 10/2012 | Deighton et al. | |
| 2016/0209015 A1 | 7/2016 | Mumma | |

FOREIGN PATENT DOCUMENTS

| | | |
|---|---|---|
| EP | 2325552 | 5/2011 |
| FR | 2260063 | 8/1975 |
| GB | 598388 | 2/1948 |
| GB | 2476466 | 6/2011 |
| WO | 2008/072194 | 6/2008 |
| WO | 2008/091931 | 7/2008 |
| WO | 2009/108455 | 9/2009 |
| WO | 2011/023957 | 3/2011 |

OTHER PUBLICATIONS

Pelican Products, "Pelican™ 9430 Remote Area Lighting", printed Jan. 6, 2014, 2 pages, http://pelicanproducts.us/p.Pelican.9430.RALS.html.

Pelican Products, "9430SL Spot Light Remote Area Lighting System", printed Jan. 6, 2014, 1 page, http://pelican.com/lights_detail_aalg.php?recordID=9430SL.

Pelican Products, "9430SL Spot Light Remote Area Lighting System Specficiations", printed Jan. 8, 2014, 2 pages, http://pelican.com/lights_detail_print_aalg.php?recordID=9430SL.

Ritelite Systems Ltd, "Supalite K9 Portable Worklight", v1.0, printed Jan. 8, 2014, 2 pages.

Ritelite Systems Ltd, "Supalite K9 Portable Worklight", printed Jan. 8, 2014, 2 pages, http://www.ritelite.co.uk/utilities/products/portable_lighting/supalite_k9s/supalite_k9.html.

European Patent Office, "Supplementary European Search Report for EP Application No. 15734983.8", dated Jul. 13, 2017, 6 pages.

* cited by examiner

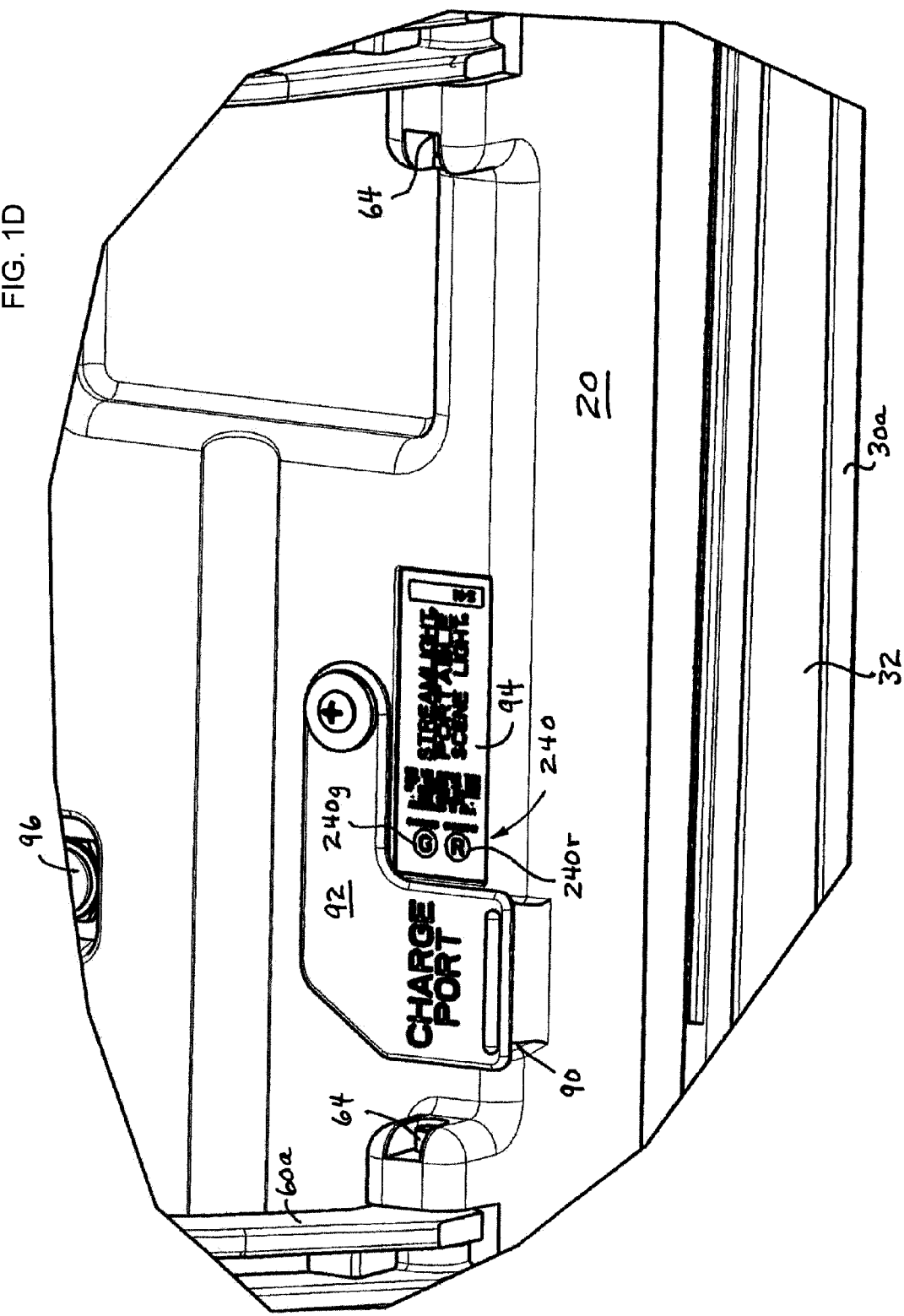

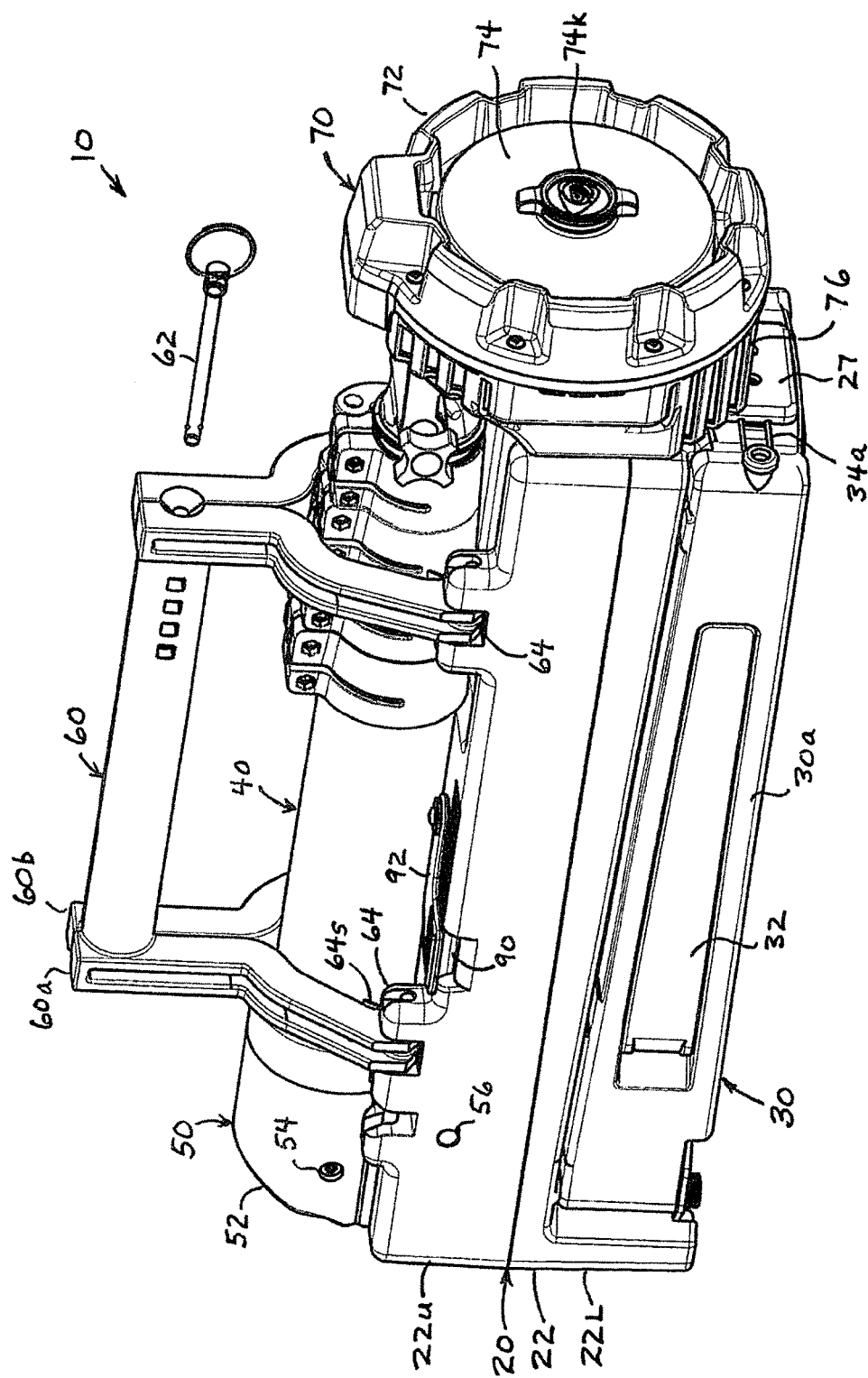

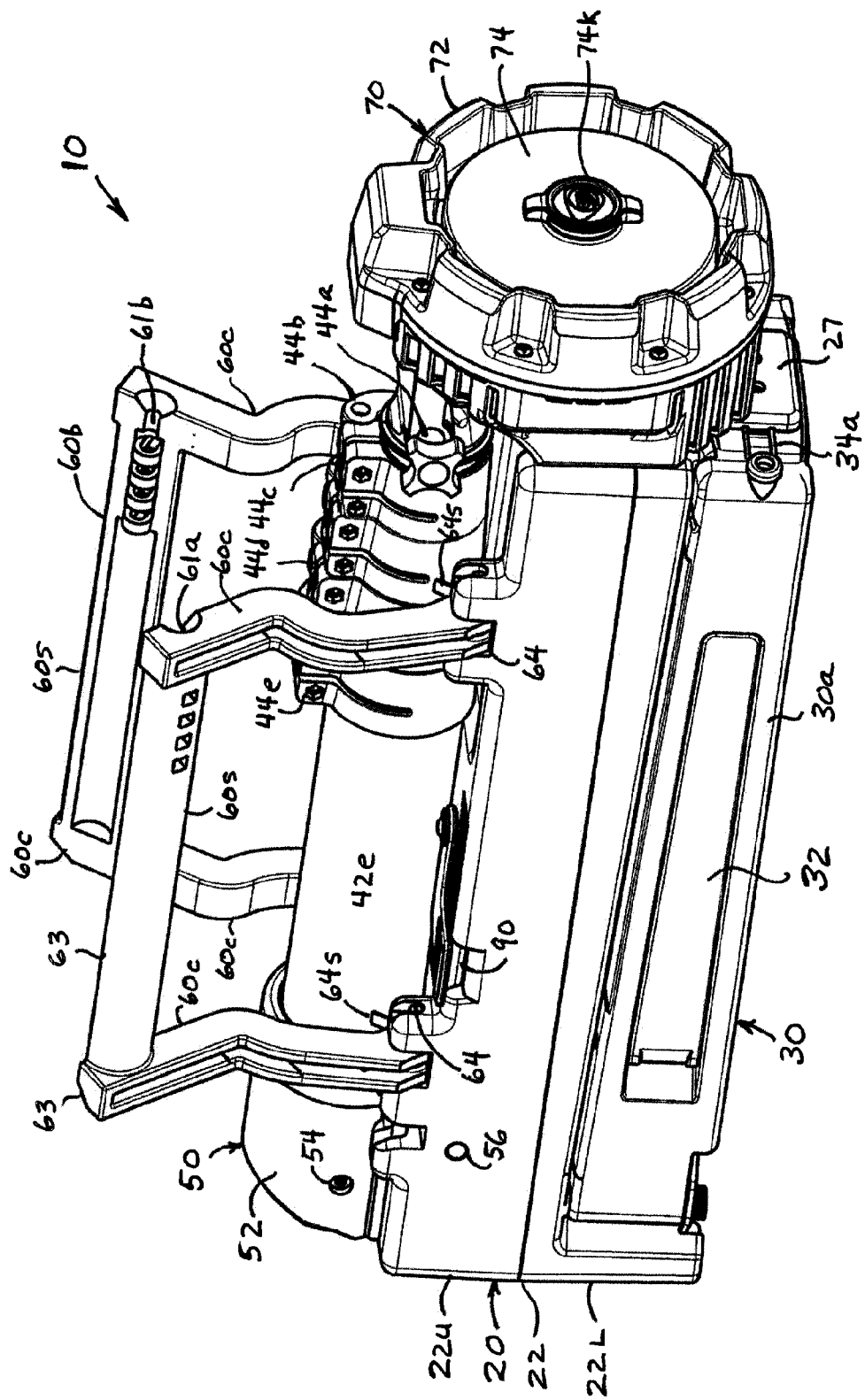

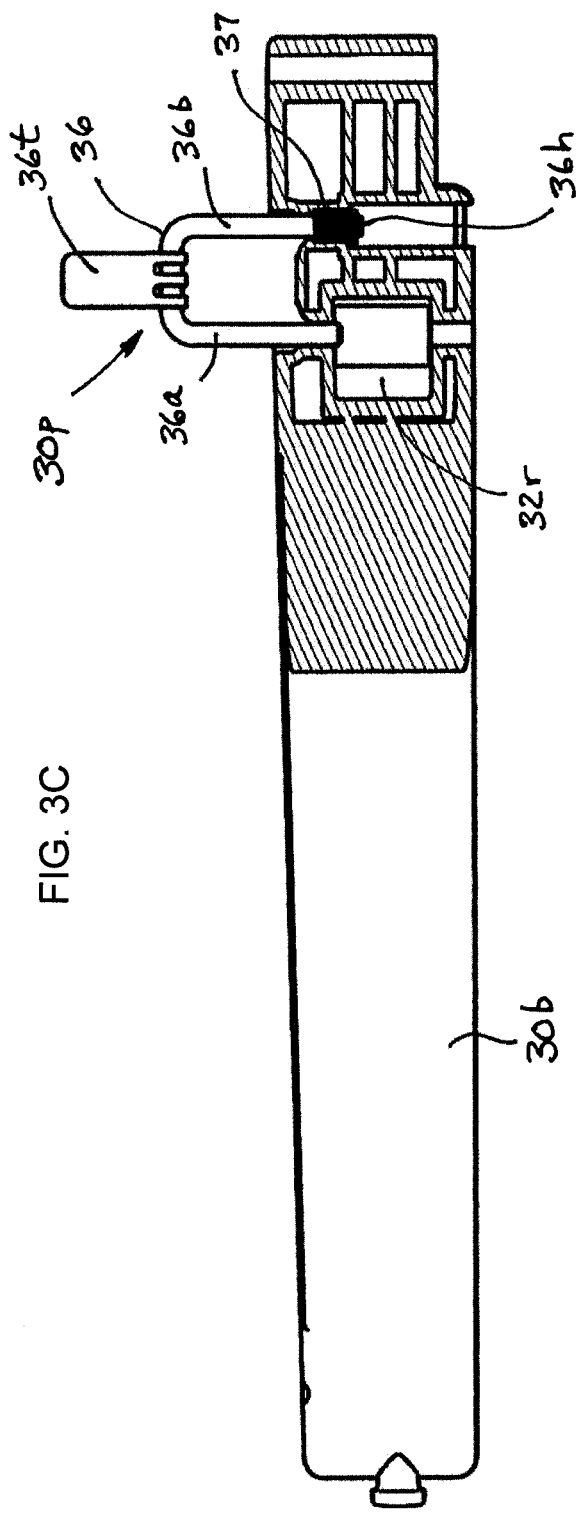

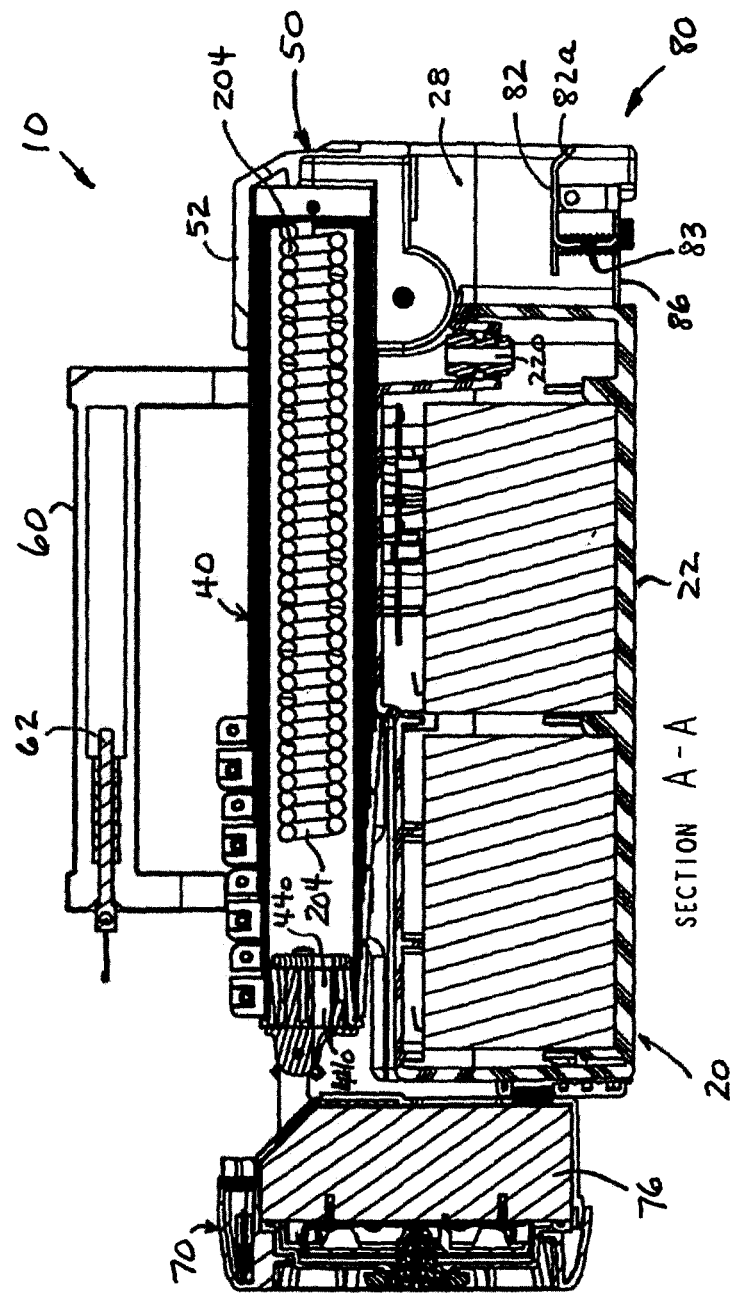

PORTABLE LIGHT HAVING A DEPLOYABLE POLE AND LATCH ARRANGEMENT THEREFOR

This Patent Application is a division of U.S. patent application Ser. No. 14/592,450 entitled "PORTABLE LANTERN AND SCENE LIGHT" filed Jan. 8, 2015, the Title of which was amended to "PORTABLE LIGHT HAVING DEPLOYABLE LEGS AND/OR AN EXTENDABLE POLE USABLE AS A LANTERN AND/OR A SCENE LIGHT," which claims the benefit of US Provisional Patent Application No. 61/925,388 entitled "PORTABLE LANTERN AND SCENE LIGHT" filed Jan. 9, 2014, each of which is hereby incorporated herein by reference in its entirety.

The present invention relates to a portable light and, in particular, to a portable light having a deployable pole and a latch therefor.

Lighting of a relatively large area, e.g., at a work site or event, requires a light source that provides substantial light over the area or scene of interest. In many instances the area or scene to be illuminated is not close to electrical power, e.g., a 120 volt or other wired power outlet, and so a portable light having a source of electrical power associated therewith is desirable. Such light should be portable, easily deployable and relatively stable when deployed, and should not have any parts that are separable and susceptible to becoming misplaced or lost.

Existing conventional portable area or scene lights are seen as being heavy, and lacking in convenience, versatility and in light outputs. One example thereof has a swiveling telescope mast that extends to about 32 inches (about 82 cm) so that the light head is elevated less than about three feet (less than about 90 cm) and can produce only a 90° flood beam. Another model of that example light can produce only a 10° spot beam. Both provide only two brightness levels. Another example work light has a telescope mast that provides a height of up to about 34 inches (about 86 cm) and requires additional separate external parts, e.g., an additional separate telescope mast and/or an additional separate tripod base, to raise the light higher. All of the foregoing lights have an exposed coil cable that extends from its base to the light and that hangs exposed alongside the mast where it is susceptible to being damaged and/or being snagged and possibly tipping the light over.

Applicant believes there is a need for a portable light that provides what may be seen as a versatile configuration and optionally with selectable light output. Preferably such light should be self contained, capable of greater height and convenient to deploy.

In addition, Applicant believes there is a need for a portable light that provides what may be seen as an easily deployable support arrangement by which the portable light will have improved stability when placed upon a surface as compared to a light without such arrangement.

Further, Applicant believes there is a need for a portable light having a deployable pole on which is disposed a light source wherein the light pole can be latched when deployed and can be unlatched when the deployable pole is to be moved from the deployed position.

Accordingly, a portable light may comprise: a base including a source of electrical power and a bottom surface; a light source supported by the base; an electrical switch connecting the light source to the source of electrical power to produce light; at least two deployable legs pivotably deployable to extend away from the base and adjacent to a supporting surface on which the portable light may be placed; and a brace configured for engaging at least two of the deployable legs. Thus, the brace when engaged substantially fixes the at least two deployable legs in predetermined deployed positions to define with the base a three leg tripod-like structure for the portable light.

A portable light may comprise: a generally rectangular base including a source of electrical power and a bottom surface; a light source supported by the base; an electrical switch connecting the light source to the source of electrical power to produce light; two deployable legs pivotably supported proximate adjacent corners of the base to be pivotably deployable about an axis substantially perpendicular to the bottom surface of the base to extend away from the base in a plane substantially parallel to the bottom surface and adjacent to the supporting surface on which the portable light may be placed; and a brace pivotably supported by one of the two deployable legs and configured for engaging a second one of the two deployable legs. Thus the brace when engaged substantially fixes the two deployable legs in predetermined deployed positions relative to the base to define with the base a three leg tripod-like structure for the portable light.

Also, a portable light may comprise: a base including a source of electrical power; one or more deployable legs supported by the base; an extendable pole pivotably supported by the base, the extendable pole being collapsible and pivotable to a stowed position adjacent the base and extendable to a deployed position extending from the base; and a light source supported at the end of the extendable pole distal the base.

A portable light may comprise: a base including a source of electrical power; a pole pivotably supported by the base, the pole being pivotable to a position adjacent the base and pivotable to a position extending from the base; a split handle on the base including separable first and second handle parts that provide a handle and together may be closable over the pole when the pole is in the position adjacent the base and that separate for enabling the pole to be pivoted relative to the base; and a light source supported at the end of the pole distal the base.

A portable light may comprise: a base including a source of electrical power; one or more deployable legs pivotably supported on the base; an extendable pole pivotably supported by the base, the extendable pole being extendable and collapsible and pivotable into and out of a stowed position adjacent the base and extendable to a deployed position extending from the base; the extendable pole including a plurality of telescoping sections and one or more clamps for maintaining the telescoping sections of the extendable pole in an extended configuration; a split handle on the base including separable first and second handle parts that provide a handle and together may be closable over the extendable pole when the extendable pole is pivoted to be in the position adjacent the base, wherein the first and second separable handle parts separate for enabling the extendable pole to be pivoted relative to the base; and a light source supported at the end of the extendable pole distal the base.

A portable light may comprise: a base including a source of electrical power; a deployable pole pivotably supported on the base; a light source supported on the deployable pole; an electrical switch connected for selectively energizing the light source to produce light; and a latch assembly configured to retain the deployable pole in a deployed position and to release the deployable pole from the deployed position at which it is retained thereby. The latch assembly may include a latch plate biased to move to engage the deployable pole when the deployable pole is in the deployed position, the latch plate being movable to disengage the deployable pole whereby the deployable pole is released to be moved from the deployed position.

A portable light may comprise: a base including a source of electrical power; a deployable extendable pole pivotably supported on the base; a light source movably supported on the deployable extendable pole; an electrical switch for selectively energizing the light source to produce light; and a latch assembly supported on the base, the latch assembly being configured to retain the deployable extendable pole in a deployed position whereat the deployable extendable pole is pivoted away from the base and to release the deployable extendable pole whereby the deployable extendable pole can be pivoted from the deployed position at which it is retained by the latch assembly. The latch assembly may include a pivotable latch plate and a spring to bias the pivotable latch plate toward the deployable extendable pole to engage the deployable extendable pole when the deployable extendable pole is in the deployed position, the pivotable latch plate being pivotable to move away from the deployable extendable pole against the spring bias to disengage the deployable extendable pole whereby the deployable extendable pole is released to be moved from the deployed position.

In summarizing the arrangements described and/or claimed herein, a selection of concepts and/or elements and/or steps that are described in the detailed description herein may be made or simplified. Any summary is not intended to identify key features, elements and/or steps, or essential features, elements and/or steps, relating to the claimed subject matter, and so are not intended to be limiting and should not be construed to be limiting of or defining of the scope and breadth of the claimed subject matter.

BRIEF DESCRIPTION OF THE DRAWING

The detailed description of the preferred embodiment(s) will be more easily and better understood when read in conjunction with the FIGURES of the Drawing which include:

FIG. 1D is an enlarged view of a portion of FIG. 1C;

FIGS. 3C and 3D are enlarged cross-sectional views of a portion of a leg thereof;

FIG. 4C is a cross-sectional view of the example portable light and telescoping pole thereof with the telescoping pole pivoted to a stowed position.

Figure 1A:
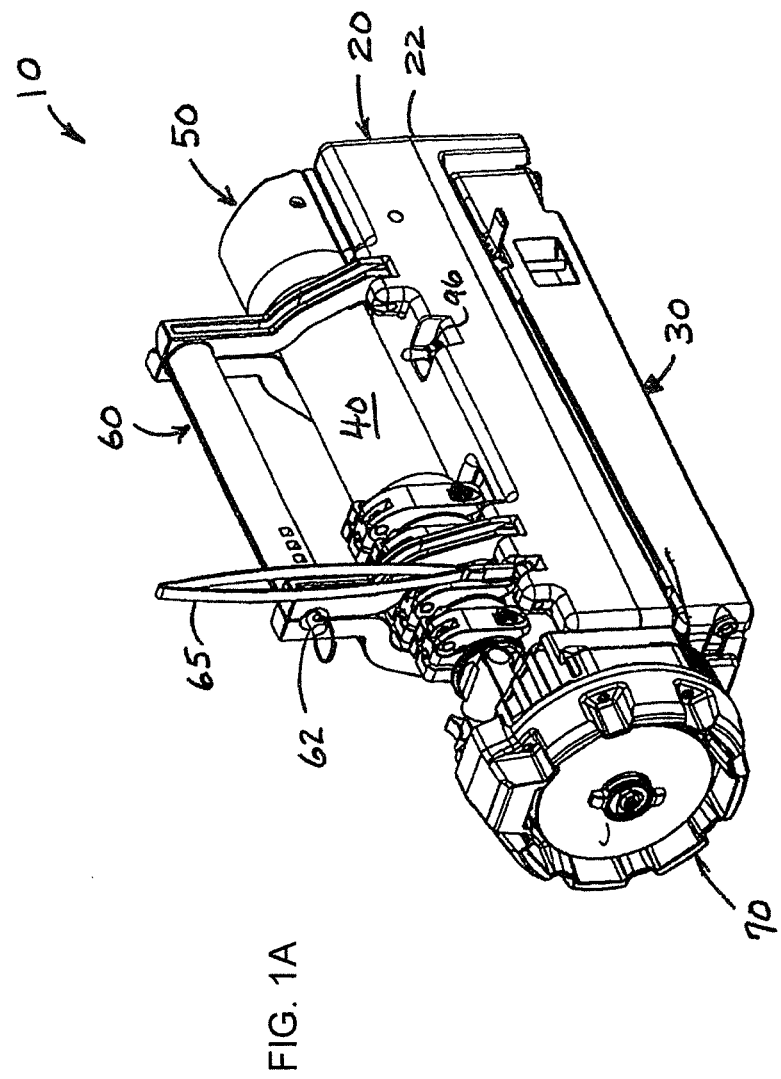
FIGS. 1A and 1B are left and right perspective views of an example embodiment of a portable lantern and scene or area light in its lantern configuration.

In the Drawing, where an element or feature is shown in more than one drawing figure, the same alphanumeric designation may be used to designate such element or feature in each figure, and where a closely related or modified element is shown in a figure, the same alphanumerical designation primed or designated "a" or "b" or the like may be used to designate the modified element or feature. Similarly, similar elements or features may be designated by like alphanumeric designations in different figures of the Drawing and with similar nomenclature in the specification. According to common practice, the various features of the drawing are not to scale, and the dimensions of the various features may be arbitrarily expanded or reduced for clarity, and any value stated in any Figure is given by way of example only.

DESCRIPTION OF THE PREFERRED EMBODIMENT(S)

In one preferred embodiment, a portable light 10 includes a base 20, one or more legs 30 deployable from base 20 to define with base 20 a tripod like base, an extendable pole 40 that is pivotable relative to base 20 from a stowed position adjacent base 20 to an erect position extending from base 20, the telescoping pole 40 having a plurality of sections to be extendable along its longitudinal axis, and a light head 70 at the end of telescoping pole 40 distal base 20, whereat light head 70 is articulable over a wide range of angles of elevation and azimuth. Preferably a latch 80 snaps into latching engagement when telescoping pole 40 is pivoted to its fully erected position and is easily releasable by moving a latch plate on base 20. Preferably a spring biased split carrying handle 60 is separable without user involvement by the pivoting of telescoping pole 40 and split handle 60 returns itself to its closed carrying position when telescoping pole 40 is clear of handle 60, preferably whether telescoping pole 40 is being pivoted away from its stowed position adjacent base 20 or is being pivoted toward that stowed position. In a most preferred arrangement, light head 70 provides light at a plurality of brightness levels and having plural beam shapes, and all of the parts of portable light 10 are captive or otherwise attached to light 10 so that there is little possibility of any part becoming misplaced or lost.

The most preferred embodiment of portable light 10 may be employed as a lantern and/or as a work light, area light and/or scene light, has substantial height extension for light head 70, is rapidly and conveniently deployable to any of a large number of configurations, and is easily transportable.

Figure 1B:
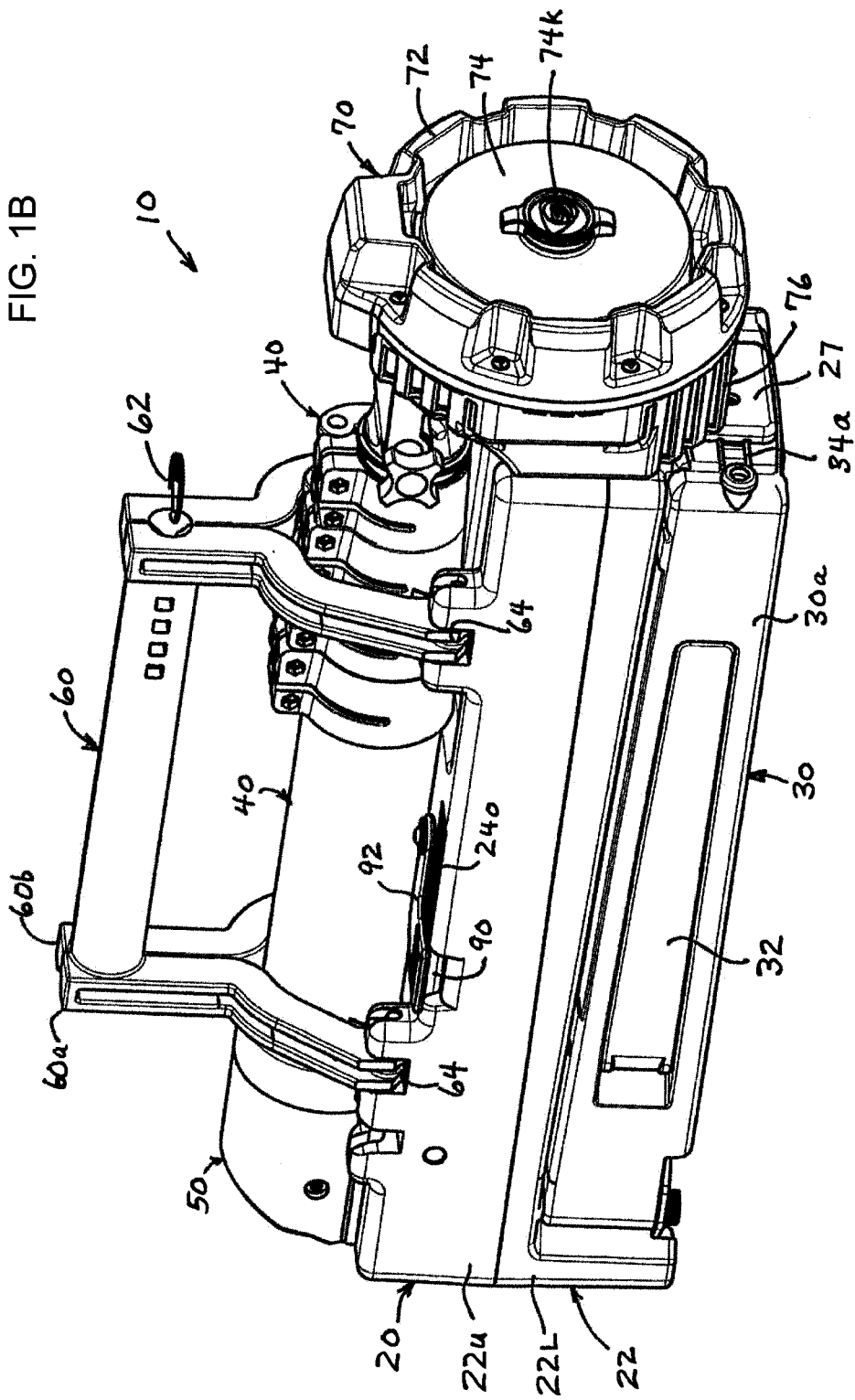
Figure 1C:
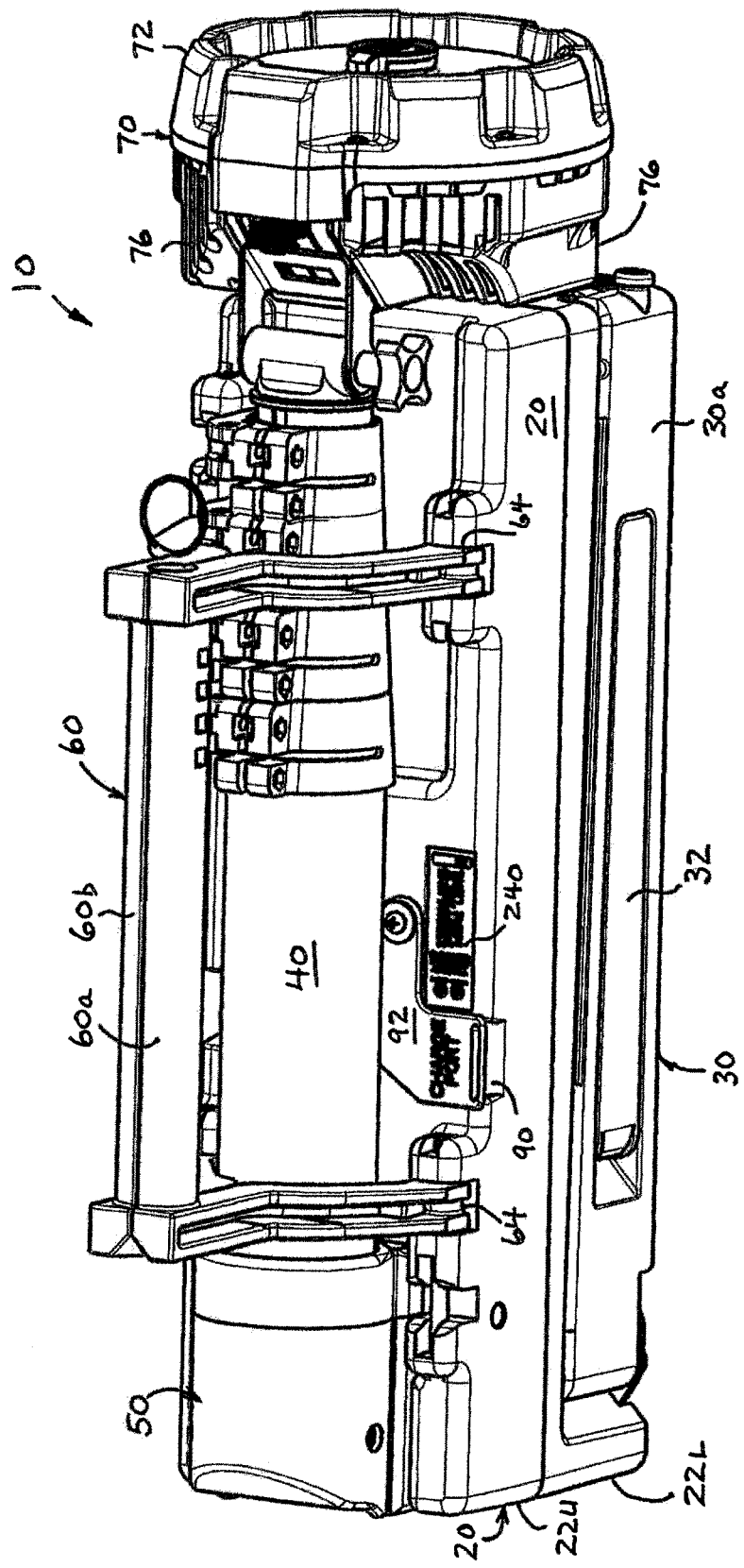
FIG. 1C is a top perspective view thereof.

FIGS. 1A and 1B are left and right perspective views of an example embodiment of a portable lantern and scene or area light 10 in its lantern configuration, FIG. 1C is a top perspective view thereof, and FIG. 1D is an enlarged view of a portion of FIG. 1C. Portable light 10 includes deployable elements 30, 40, 50, 70 that facilitate light 10 being employed in a lantern light 10 configuration when the deployable elements 30, 40, 50, 70 are stowed or substantially stowed, and being employed in an area light 10 or scene light 10 configuration when the deployable elements 30, 40, 50, 70 are partially or fully deployed, and light 10 may also be used in configurations with the deployable elements 30, 40, 50, 70 being partially stowed and partially deployed.

Portable light 10 includes a base 20 or housing 20, 22 that supports one or more deployable legs 30 and an extendable pole 40 supported on a pivot and latch assembly 50. In a typical embodiment, housing 20, 22 is generally rectangular, is formed of upper 22u and 22L housing parts, and contains a source of electrical power, e.g., one or more batteries, and electronic circuitry that controls the operation of light 10 responsive to an electrical switch, e.g., a switch on housing 20, 22.

Deployable legs 30 may include, e.g., one or more legs 30a, 30b, pivotably supported by housing 20, 22 and deployable to extend from base or housing 20, 22 in a manner so that they cooperate with base 20 to provide one or more points of contact with a surface on which base 20 may be placed. In a preferred arrangement, two legs 30a, 30b deploy generally horizontally from base 20 to serve as two legs of a tripod with base 20 serving as the third leg thereof. Legs 30a, 30b preferably deploy at about 120° to each other and to base 20, but may deploy to angles in a range of, e.g., about 90° to 150°, while providing acceptable stability. Legs 30a, 30b may be maintained in one or more desired deployed positions by a brace 32 or another restraining element 32. It is noted that relatively heavy elements, e.g., one or more batteries, may be included within base 20, and preferably are in base 20, so as to beneficially increase the stability of light 10 when fully deployed. One or more latches or loops, e.g., latches 34a, 34b, may be provided for maintaining the one or more legs 30a, 30b in their respective stowed positions adjacent base 20, and may be attached to housing 22 by a plate 27.

Extendable pole 40 is preferably a telescoping pole 40 having a plurality of telescoping sections and a plurality of releasable clamps at respective ends of the sections for releasing the telescoping sections for their being extended and collapsed and for clamping the telescoping sections for maintaining them in desired positions of extension and collapse, i.e. extended to desired lengths.

Extendable pole 40 is preferably connected to base 20 by a pivot and latch assembly 50 that pivotably or otherwise rotatably connects pole 40 to base 20 so that pole 40 may be rotated or pivoted from a position adjacent to base 20 to a position extending from base 20. Assembly 50 also preferably provides a latch for maintaining extendable pole 40 in a desired erected position, e.g., as described below.

A light source 70 is supported at the end of extendable pole 40 distal from base 20 and preferably is positionable for directing light in any of a large number of desired directions. Light source 70 may provide a spot beam, a flood beam, a wide area or scene illuminating beam, or a combination thereof, and/or may be controllable for providing any one or more of the foregoing types of beams. Light source 70 may, in cooperation with electronic control circuitry, be controllable for providing light at two or more different levels of brightness or light intensity. Preferably, electrical connections between base 20 which contains a source of electrical power and control circuitry and light source 70 which contains one or more light producing elements are provided by conductors, e.g., wires that pass through the hollow interiors of the sections of telescoping pole 40. In one preferred arrangement, these conductors comprise a springy coil cable containing plural insulated electrical conductors, and the springiness of the cable allows telescoping pole 40 to be extended and collapsed without interference by the conductors interior thereto.

One preferred example light head or light source 70 comprises a housing or face plate 72 that holds lens assembly 74 and one or more reflectors and light sources to heat sink 76. Typically, light head 70 contains a plurality of light emitting elements, e.g., light emitting diodes (LEDs), positioned to direct light outwardly through lens assembly 74. In one embodiment, lens assembly 74 is rotatable by rotating actuator knob 74k for changing one or more characteristics of the light emitted. In one preferred example, lens assembly 74 can be rotated to change the light emitted from a generally relatively focused or spot type of beam to a generally diffuse or unfocused flood type of beam. Lens assembly 74 may also be rotated by actuator knob 74k for selecting from among available beam types, e.g., spot or flood beams, and actuator knob 74k has an actuator button which may be actuated one or more times for selecting one or more predetermined levels of illumination to be produced by the light sources of light head 70. Light source 70 may also include a heat sink 76 for removing heat generated by the operation of the light emitting elements of light source 70, e.g., the heat sink preferably having a plurality of walls or fins and/or passages that increase the surface area thereof.

Light 10 preferably includes a handle 60 on base or housing 20, 22 for carrying light 10 from place to place. In a preferred embodiment, handle 60 includes a split handle 60 having complementary handle parts 60a, 60b that cooperate together to provide handle 60, and further cooperate in maintaining extendable pole 40 in its stowed position. Preferably, handle 60 divides longitudinally, i.e. in a plane generally including the central axis of extendable pole 40. Preferably a handle pin 62 holds handle parts 60a, 60b together in their closed positions whereat extendable pole 40 is confined by handle 60 so as to be adjacent base 20. Handle parts 60a, 60b preferably separate for allowing extendable pole 40 to be deployed, e.g., pivoted, from its stowed position to its erected or deployed position, and for allowing extendable pole 40 to be moved from its deployed position to its stowed position. Preferably a lanyard 65 is provided for attaching handle pin 62 to base 20. Typically lanyard 65 is attached to base 20 at a hinge pin of handle hinge 64 and to handle pin 62 at a split ring thereof so that handle pin 62 is not easily separable from light 10 and so is not subject to being misplaced or lost.

Preferably the source of electrical power included in base 20 is a rechargeable source of electrical power, e.g., one or more rechargeable batteries. To this end, a charging connector 90 or charging port 90 may be provided on base 20 for receiving electrical power from a charging device for recharging rechargeable portable light 10. Preferably a cover 92 is provided for charging port 90, e.g., an elastomeric or other flexible cover 92, for helping to keep dirt, moisture, debris and other undesirable material from getting into charging port 90.

Preferably and optionally, one or more battery indicators 240 are provided on base 20 so that the status of the batteries therein will be indicated. In one preferred arrangement, a red indicator light 240r is illuminated continuously when the battery is not fully charged and is being charged and a green indicator 240g is illuminated continuously to indicate that the battery is fully charged. Further and optionally, one indicator, e.g., the red indicator is illuminated in a flashing or blinking manner to indicate that the battery is approaching a condition wherein it will be fully discharged. In one embodiment, one or more indicators 240 are disposed in one or more openings in upper housing 20u proximate charging port 90, and a moisture resistant seal, e.g., an adhesively attached plastic sheet 94, which may also serve as a label, is provided.

FIG. 2 is a perspective view of the example embodiment of a portable lantern and scene or area light 10 of FIG. 1 and FIGS. 2A through 2F illustrate perspective views of an example deployment sequence of the example portable light 10 from its lantern or stowed configuration to its erected or fully deployed configuration, e.g., its area light or scene light configuration. While this example sequence illustrates certain elements as being deployed in a particular order, the sequence of deployment may be re-ordered to suit user need and/or desire and/or a particular location. For example, legs 30 may be deployed before or after telescoping pole 40 is deployed and/or extended (erected).

In FIG. 2A, portable light 10 is illustrated essentially in its fully stowed configuration, and showing handle pin 62 as removed from handle 60 so as to allow handle parts 60a, 60b to pivot on handle hinges 64 so as to separate so that telescoping pole 40 may be pivoted on pivot and latch assembly 50 from its stowed position adjacent base 20 to a deployed position extending from base 20, e.g., vertically or upward. Handle pin 62 is preferably attached to base 20 by a lanyard or tether 65 (not shown in this view) that is attached to a split ring of handle pin 62 and to base 20, e.g., at a handle hinge 64, e.g., with a ring of lanyard 65 being held by a hinge pin thereof. Legs 30a, 30b are adjacent base 20 and are preferably maintained in that position by latches 34a which may be elastic loops, wire loops, tethered straps, tethered snaps or any other suitable latch. Typically, a pair of latches 34a may be provided by a single piece of flexible material that is attached to housing 22 by a plate 27 secured by one or more fasteners.

In FIG. 2B, portable light 10 is illustrated further deployed in that handle parts 60a, 60b are separated so that telescoping pole 40 may pass therebetween as telescoping pole is pivoted on pivot and latch assembly 50. Handle parts 60a, 60b may each include a straight part 60s that together provide a gripping region, e.g., a relatively straight and cylindrical handle gripping region, and two curved parts 60c that extend between a handle hinge 64 and the gripping region and are shaped to be relatively closely adjacent to stowed telescoping pole 40 when handle parts 60a, 60b are close together to retain telescoping pole 40 adjacent to base 20. Each of handle parts 60a, 60b preferably has a respective chamfer 63 at a rear interior intersection of the junction of the gripping part and the curved part so that pressing telescoping pole 40 towards its stowed position causes pole section 42e to engage the chamfers 63 which will tend to separate handle parts 60a, 60b to allow telescoping pole 40 to pass therebetween toward its stowed position adjacent base 20. Hinge springs 64s urge handle parts 60a, 60b together so that they form handle 60 in a useful generally centered position for carrying light 10.

Respective loops 61 on each of handle parts 60a, 60b are visible in this view, as are clamps 44a, 44b, 44c, 44d and 44e of telescoping pole 40. Loops 61 cooperate to define a passage through which handle pin 62 can pass to retain handle 60 in its closed configuration. The end of outer or base section 42e of telescoping pole 40 is held in a base holder 52 of pivot and latch assembly 50 by a pin, screw or other fastener 54. Pivot and latch assembly 50 pivots or hinges on a pin or other member 56 that passes through holder 52 and into respective receptacles, e.g., through holes, of opposite sides of housing 22, e.g., of upper housing 22U thereof. Hinge pin 56 is, e.g., preferably a steel pin that is secured in housing 22 by restraining items at the ends thereof, e.g., by a head at one end and/or by C or E clips that snap into respective circumferential grooves at one end or both ends thereof that do not have a head.

Figure 2C:
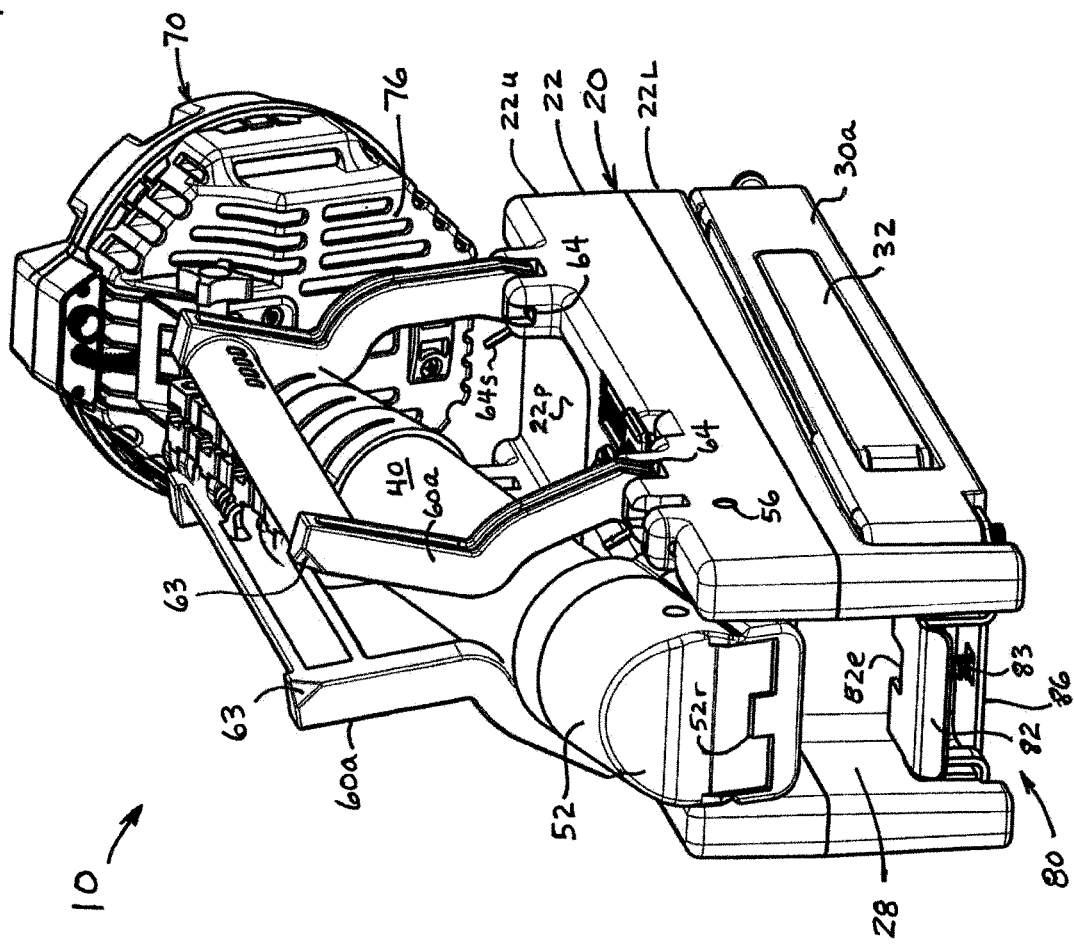
FIG. 2 is a perspective view of the example embodiment of a portable lantern and scene or area light of FIG. 1 and FIGS. 2A through 2F illustrate perspective views of an example deployment sequence of the portable light from its lantern configuration to its erected configuration.

In FIG. 2C, portable light 10 is illustrated further deployed in that telescoping pole 40 is pivoted on pivot and latch assembly 50 away from base 20 to a position between handle parts 60a, 60b. Preferably, the inside curved sections of handle parts 60a, 60b have respective curved shapes such that pivoting telescoping pole 40 away from base 20 causes handle parts 60a, 60b to separate to allow telescoping pole 40 to pass therebetween. When telescoping pole 40 is pivoted sufficiently to be clear of handle parts 60a, 60b, handle parts 60a, 60b may be returned to their closed positions whereat handle pin 62 may be placed into loops 61 to secure handle 60 in the closed position. Also preferably, one or more springs 64s of one or more of handle hinges 64 provide sufficient bias to urge handle parts 60a, 60b to return to their closed positions whereat handle pin 62 may be placed into loops 61 to secure handle 60 in the closed position.

At the rear of base 20, e.g., in a recess 28 formed by the rear ends of upper and lower housing sections 22U, 22L, in which pivot and latch assembly 50 is disposed, is a pole latch 80 for latching pivot and latch assembly 50 in a fully deployed position. Latch 80 includes a latch plate 82 that may be pressed downwards for releasing latch 80 so that pivot and latch assembly 50 is released so that telescoping pole 40 is released to be pivotable towards base 20. Latch plate 82 is pivotably mounted on a pair of legs that extend upward from support plate 86 and is biased upward toward pivot and latch assembly 50 by a latch plate spring 83. Latch plate 82 and pivot base 52 have complementary engaging features, e.g., a ridge and a recess, 52r and 82e, for providing the latching operation. Preferably engaging features 52r and 82e tend to snap into engagement when telescoping pole 40 is rotated to extend substantially perpendicularly from base 20, e.g., to be in a substantially vertical position, so as to be maintained in that position by latch 80 until released by actuation of latch plate 82, e.g., by moving the extension of latch plate 82 upwards so that the edge 82e thereof moves downward thereby to release ridge 52r.

Visible in this view is a recess 22p at least at the forward end of the top surface of upper housing 22U of base 20 between parallel raised sides 22s on which are provided hinges 64 for split handle 60. Recess 22p is for receiving therein at least part of the clamps 44b-44e of telescoping pole 40 when telescoping pole 40 is pivoted to its stowed position adjacent base 20. Optionally, recess 22p may be longer so as to extend along more of the length of upper housing 22U of base 20 to also receive therein at least part of section 42e of telescoping pole 40.

More visible in this view is the rear of light head 70 where heat sink 76 thereof is seen to include various walls and openings for permitting movement of air therethrough for increasing the removal of heat generated by the light emitting elements of light head 70.

Figure 2D:
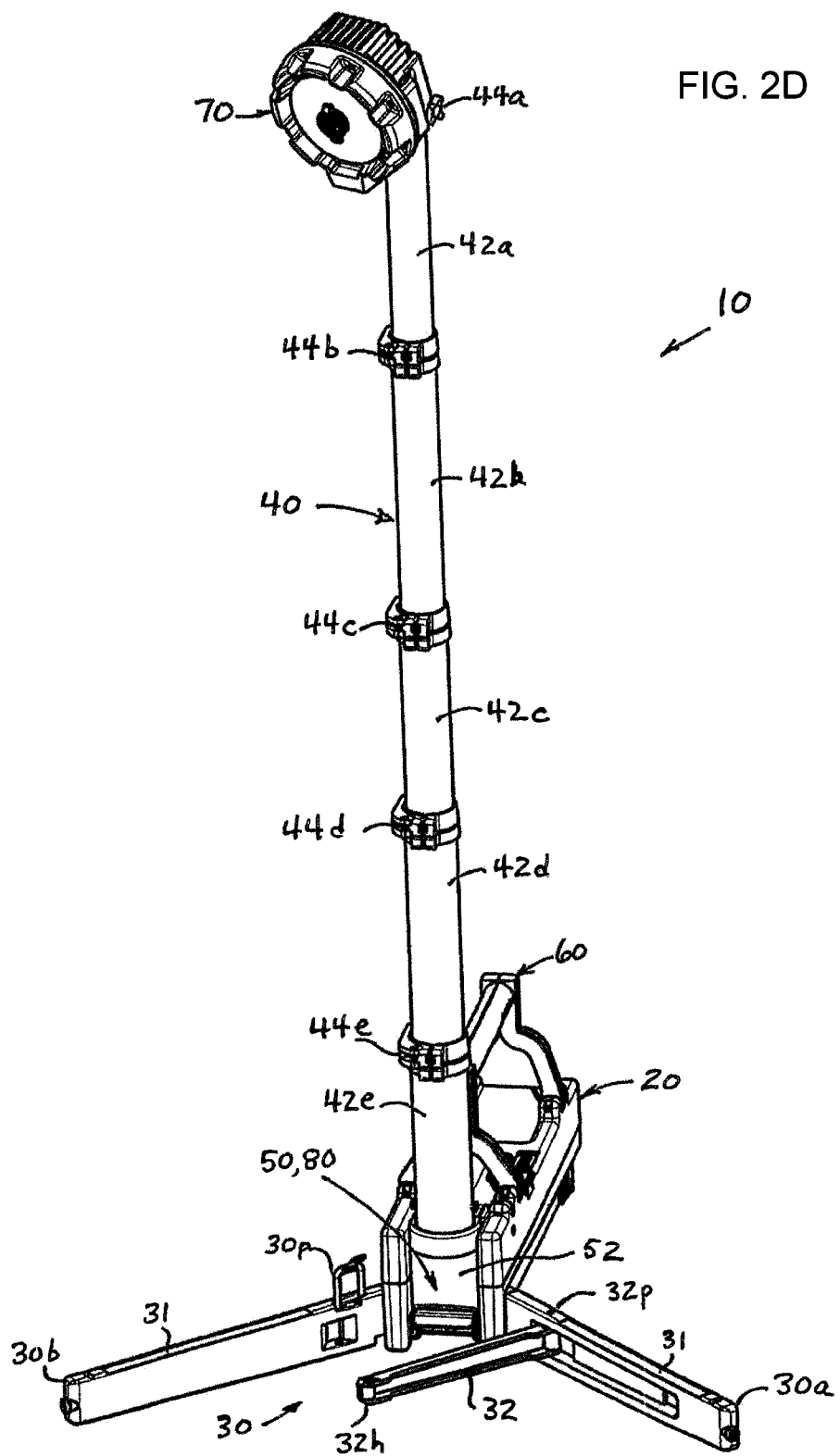

In FIG. 2D, portable light 10 is illustrated further deployed in that telescoping pole 40 is pivoted to about a vertical position whereat pivot and latch assembly 50 latches. Telescoping pole 40 is extended in that telescoping sections 42a, 42b, 42c, 42d and 42e are deployed (extended) so that light head 70 is raised to a position relatively high above base 20. Telescoping sections 42a, 42b, 42c, 42d and 42e are maintained in their respective deployed (extended) positions by respective clamps 44b, 44c, 44d and 44e at the respective ends of telescoping sections 42a, 42b, 42c, 42d and 42e distal from base 20.

Light head 70 is supported at the distal end of telescoping section 42a and may be positionable to various orientations by a clamp 44a. Thus, light head 70 may be positioned to direct light in any desired direction, e.g., over a full 360° horizontally and over almost 180° vertically. Electrical power is conducted from base 20 to light head 70, e.g., by wires enclosed within the hollow interior of telescoping pole 40, and preferably by a coiled cable of wires that is biased to compress itself and so is relaxed when telescoping pole 40 is collapsed and is under tension when telescoping pole 40 is extended. Clamps 44a, 44b, 44c, 44d and 44e may be split ring clamps closable by a threaded member or a cam member or other suitable closing device. Handle 60 is returned to its closed position, e.g., by one or more springs 34s, as described above.

Legs 30a, 30b are unlatched 34a, 34b and pivoted outwardly from base 20 so as to cooperate with base 20 to effectively provide a tripod configuration. Preferably, legs 30a, 30b are at an included angle of about 120° and are at an angle of about 120° with respect to base 20, although they may be at larger or smaller angles. One of legs 30a, 30b, e.g., leg 30a, preferably includes a pivoted brace 32 that stows in a recess thereof and is deployable, e.g., pivotable on brace pivot 32p, so that its distal end may engage the other of legs 30a, 30b, e.g., leg 30b. Such engagement may be provided by a pin 30p of leg 30b that can be passed through one or more holes in leg 30b and through one or more holes 32h of brace 32 to secure the free end of brace 32 to leg 30b, thereby to define with base 20 a triangular bracing structure that maintains legs 30a, 30 in their desired tripod-like positions relative to base 20. Preferably pin 30p is captive in leg 30b and is spring loaded so as to be biased for maintaining it securing brace 32 to leg 30b.

Figure 2E:
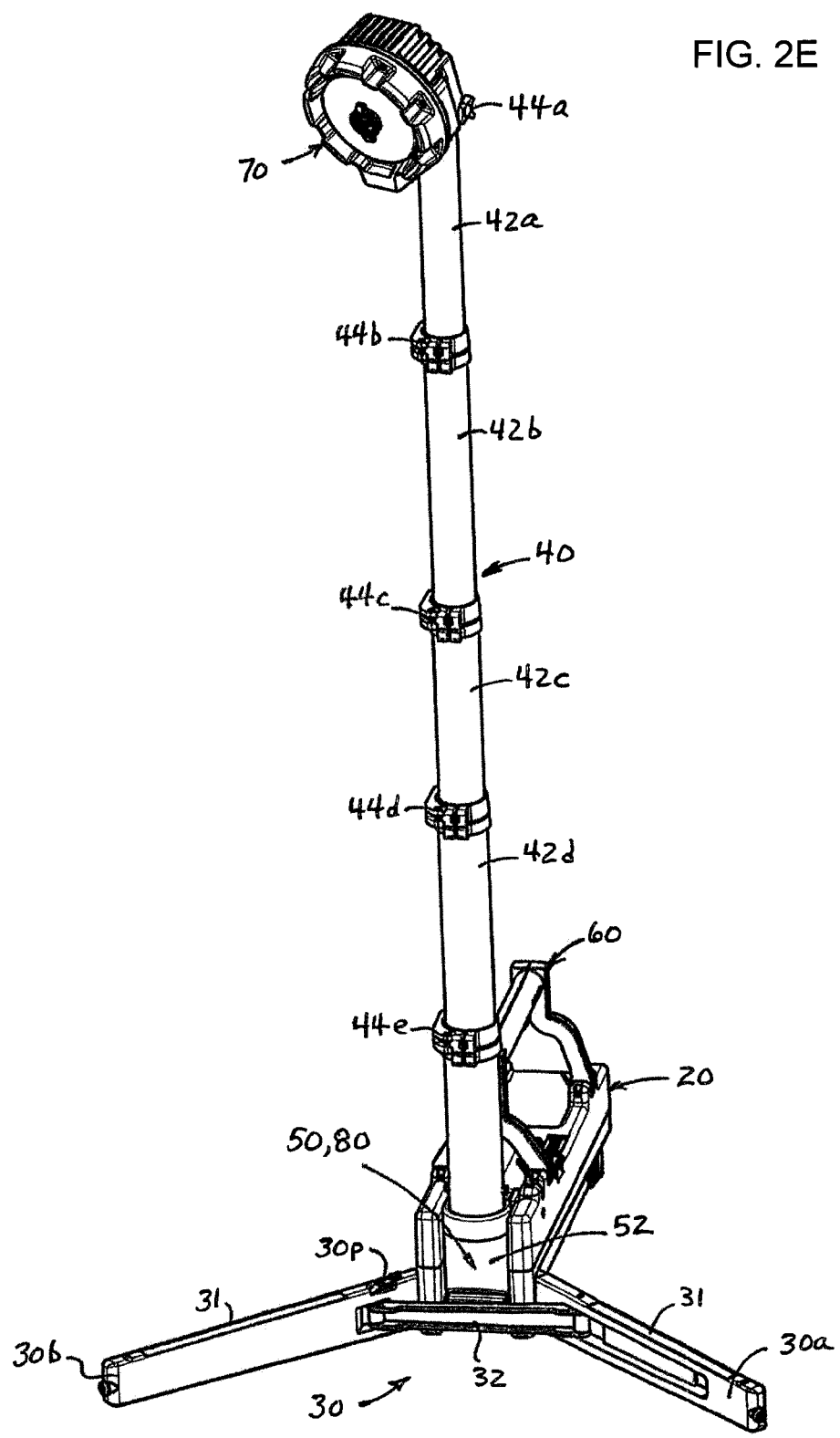

In FIG. 2E, portable light 10 is illustrated with telescoping pole 40 in a fully deployed configuration with light head 70 raised vertically on extended telescoping pole 40 above base 20 and with legs 30a, 30b secured by brace 32 connected, e.g., pinned 30p, 32p, thereto to provide with base 20 a tripod-like base.

Figure 2F:
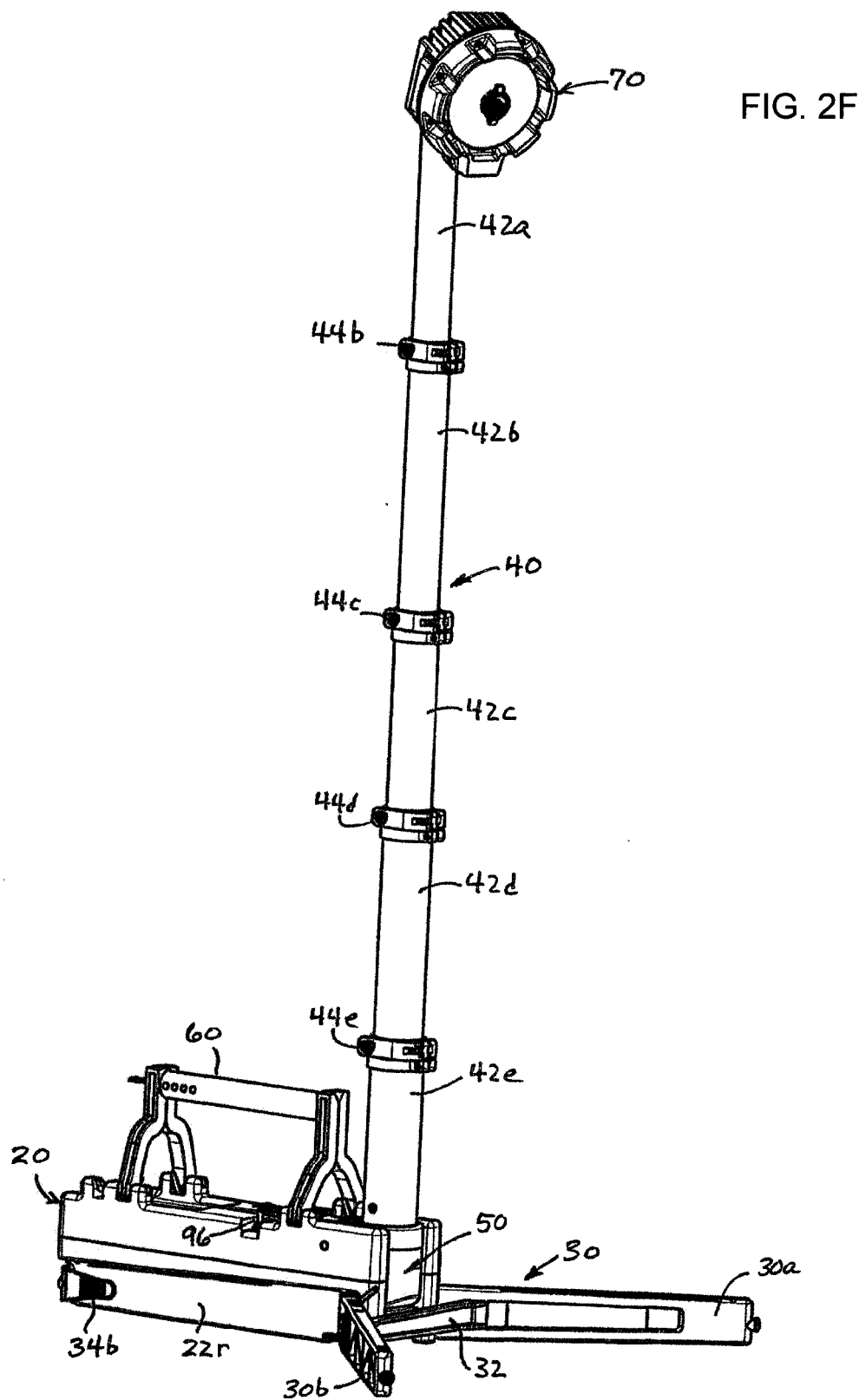

In FIG. 2F, portable light 10 is illustrated from a different viewpoint than in FIG. 2E with light head 70 raised vertically on extended telescoping pole 40 above base 20 and with legs 30a, 30b secured by brace 32 connected, e.g., pinned 30p, 32p, thereto to provide with base 20 a tripod-like base. Therein a recess 22r in lower housing 22L of base 20 is visible as is a latch 34b for maintaining leg 30b stowed in recess 22r.

Figure 3A:
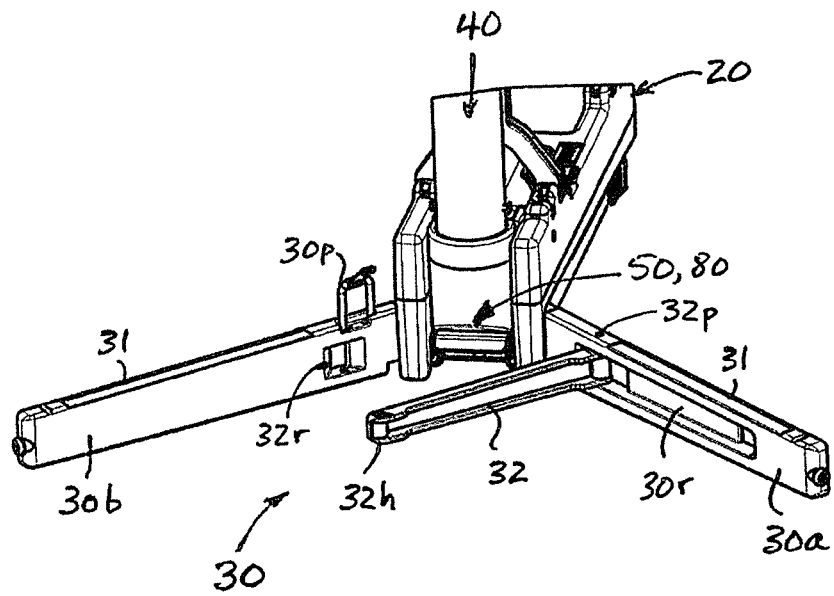
FIGS. 3A and 3B are enlarged perspective views illustrating an example deployment sequence of the legs extending from the base or housing of the example portable light, respectively.
Figure 3B:
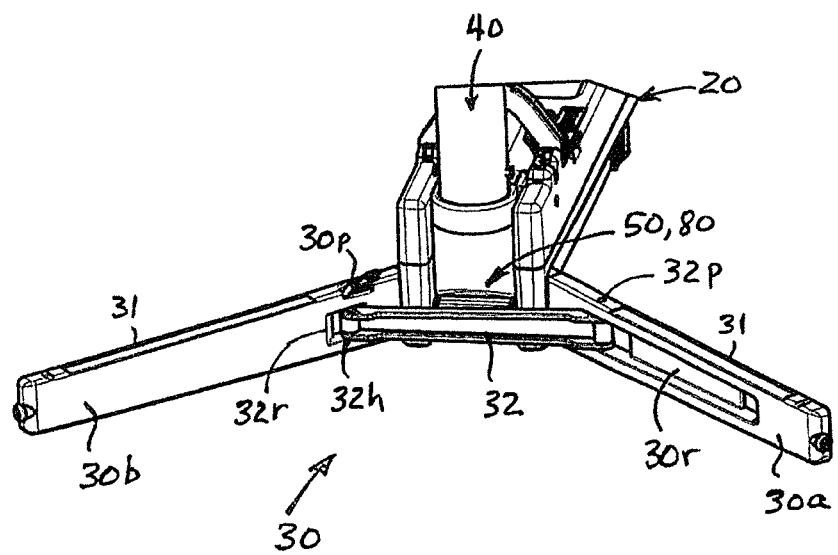
Figure 3D:
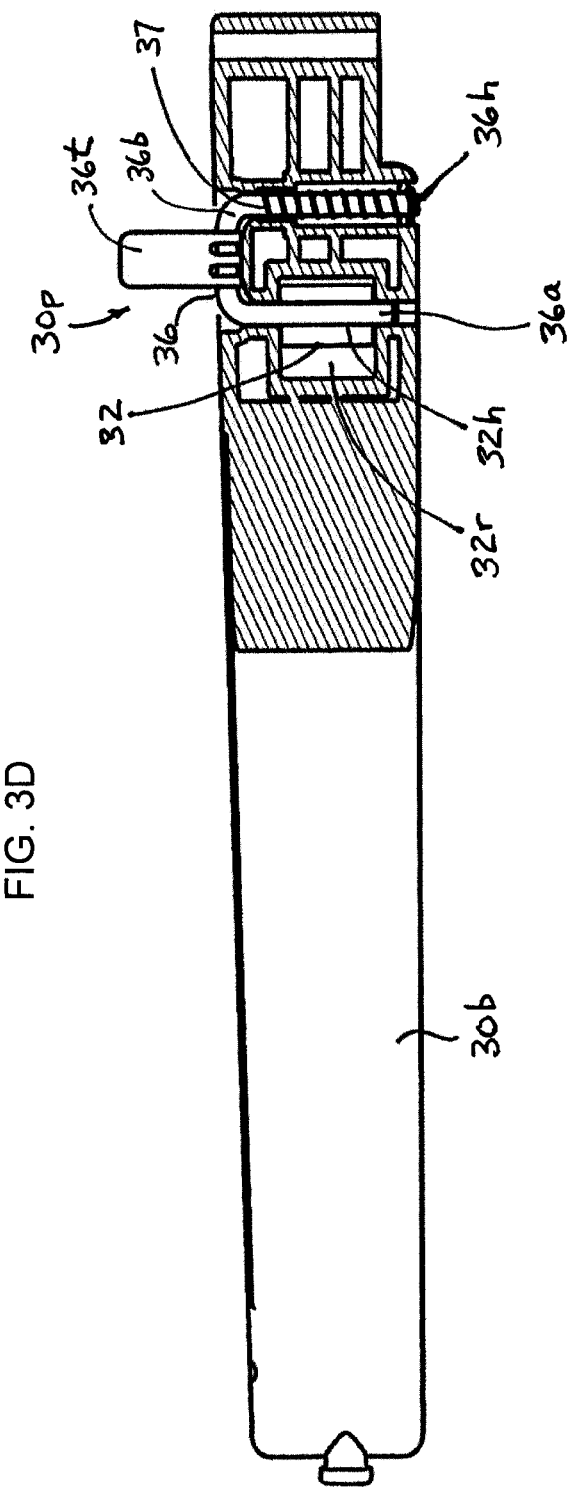

FIGS. 3A and 3B are enlarged perspective views illustrating an example deployment sequence of the legs 30 extending from the base or housing 20, 22 of the example portable light 20, respectively, and FIGS. 3C and 3D are enlarged cross-sectional views of a portion of a leg 30 thereof. In FIG. 3A, legs 30a, 30b have been unlatched 34a, 34b and pivoted outwardly from base 20. One of legs 30a, 30b, e.g., leg 30a, preferably includes a pivoted brace 32 that stows in a recess 30r thereof and is deployable, e.g., pivotable on brace pivot 32p, so that its distal end may engage the other of legs 30a, 30b, e.g., leg 30b. Such engagement may be provided by a pin 30p, e.g., a U-shaped pin 32p, of leg 30b that can be pulled upward to allow the hole 32h end of brace 32 to be positioned in a recess of leg 30b and then released downward to pass through the one or more holes in leg 30b and through one or more holes 32h of brace 32 to secure the free end of brace 32 to leg 30b, thereby to define with base 20 a triangular bracing structure that maintains legs 30a, 30 in their desired tripod-like positions relative to base 20. Preferably one leg of U-shaped pin 30p is captive in leg 30b and is spring loaded so that pin 30p is biased for maintaining it in a position whereat it can secure brace 32 to leg 30b.

In FIG. 3B legs 30a, 30b are secured to each other by brace 32 which is connected, e.g., pinned 30p, 32p, thereto to cooperate with base 20 to provide a tripod-like base. Preferably, legs 30a, 30b are at an included angle of about 120° and are at an angle of about 120° with respect to base 20, although they may be at larger or smaller angles, so as to cooperate with base 20 to effectively provide a tripod configuration.

Pin 30p includes a U-shaped pin member 36 that has two parallel ends 36a, 36b, with end 36b being longer and held captive in a hole in leg 30b by a head 36h or other enlarged portion at the end of end 36b. Between head 36h and a shoulder of the hole in leg 30b is a spring 37 that is compressed when pin 36 is pulled away from leg 30b, as shown in FIG. 3C, and which expands to urge pin 36 into respective holes in leg 30b, as shown in FIG. 3D. Pin 36 is pulled away from leg 30b to clear recess 32r of leg 30b so that the end of brace 32 may be placed therein (or removed therefrom) whereupon pin 36 is released to pass through hole 32h in the end of brace 32 thereby to retain the end of brace 32 in the recess 32r of leg 30b. Because brace 32 is pinned at one end by pin 36 and at the other end by pin 32p, it defines a fixed triangle with legs 30a, 30b and base 20, whereby legs 30a, 30b and base 20 substantially define a three legged or tripod arrangement that can stabilize base 20 upon a surface on which it is placed, thereby to reduce the likelihood that light 10 may be knocked over.

Preferably, and as a convenience, U-shaped pin 36 has a pull tab 36t, e.g., a plastic tab, that can be grasped by a user for pulling pin 36 from the position illustrated in FIG. 3D to the position illustrated in FIG. 3C. In one example embodiment, each of legs 30a, 30b may have an optional reflective region 31 or other easily seen region, e.g., on a top surface thereof. Further, base 20 may also be provided with an optional reflective region.

Figure 4A:
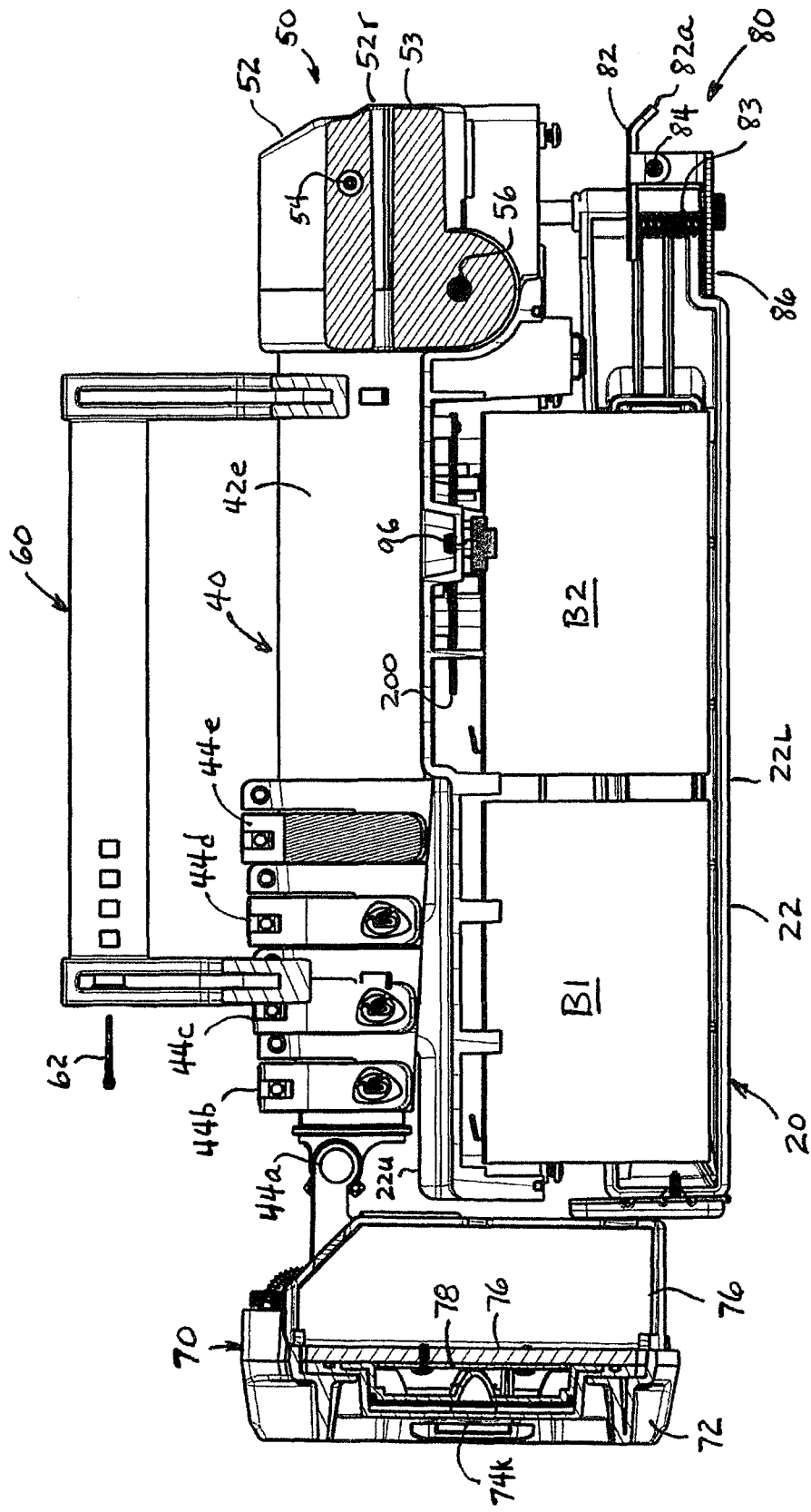
FIGS. 4A and 4B are cross-sectional views of the base or housing of the example portable light with the telescoping pole pivoted to stowed and erected positions, respectively.
Figure 4B:
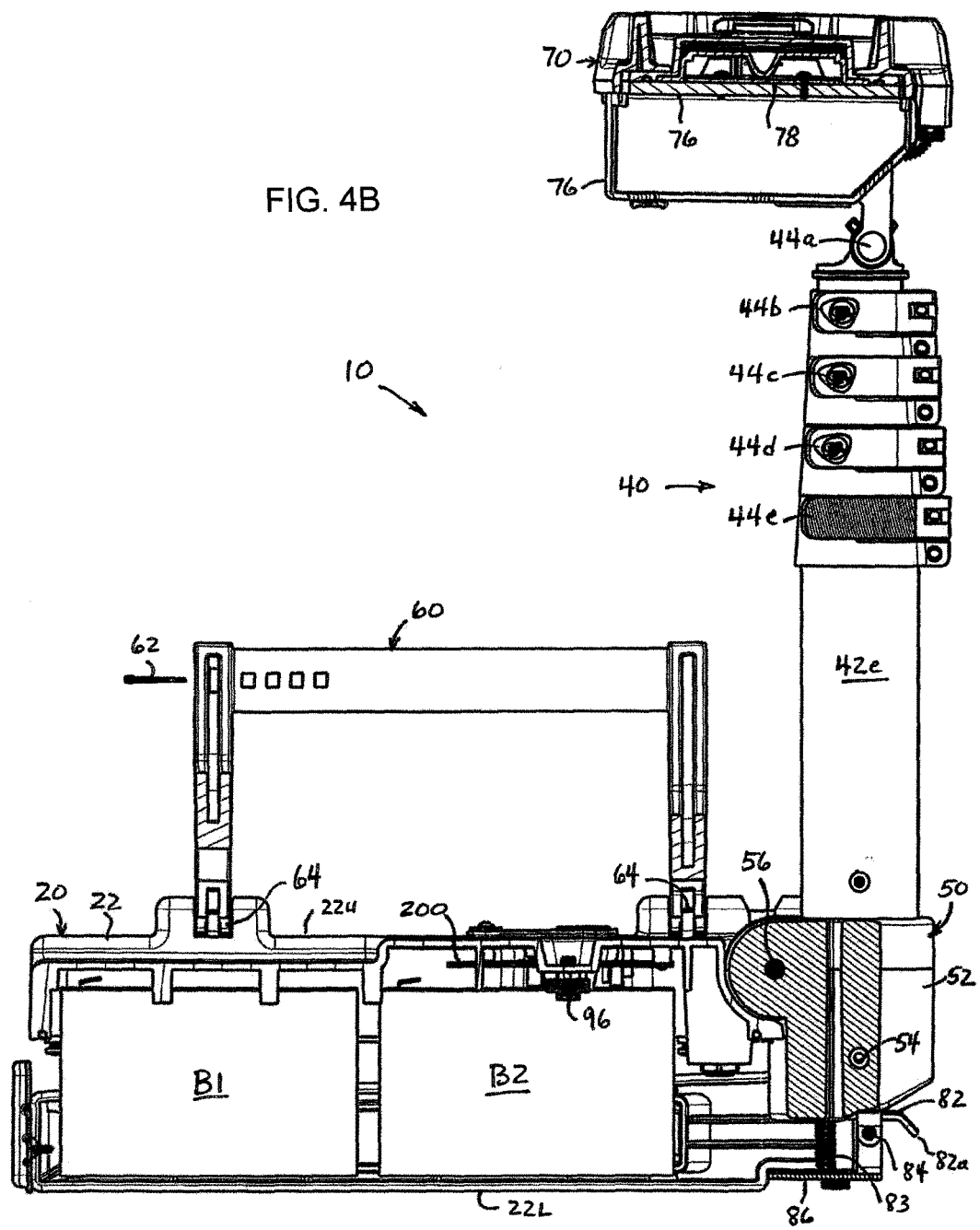
Figure 4D:
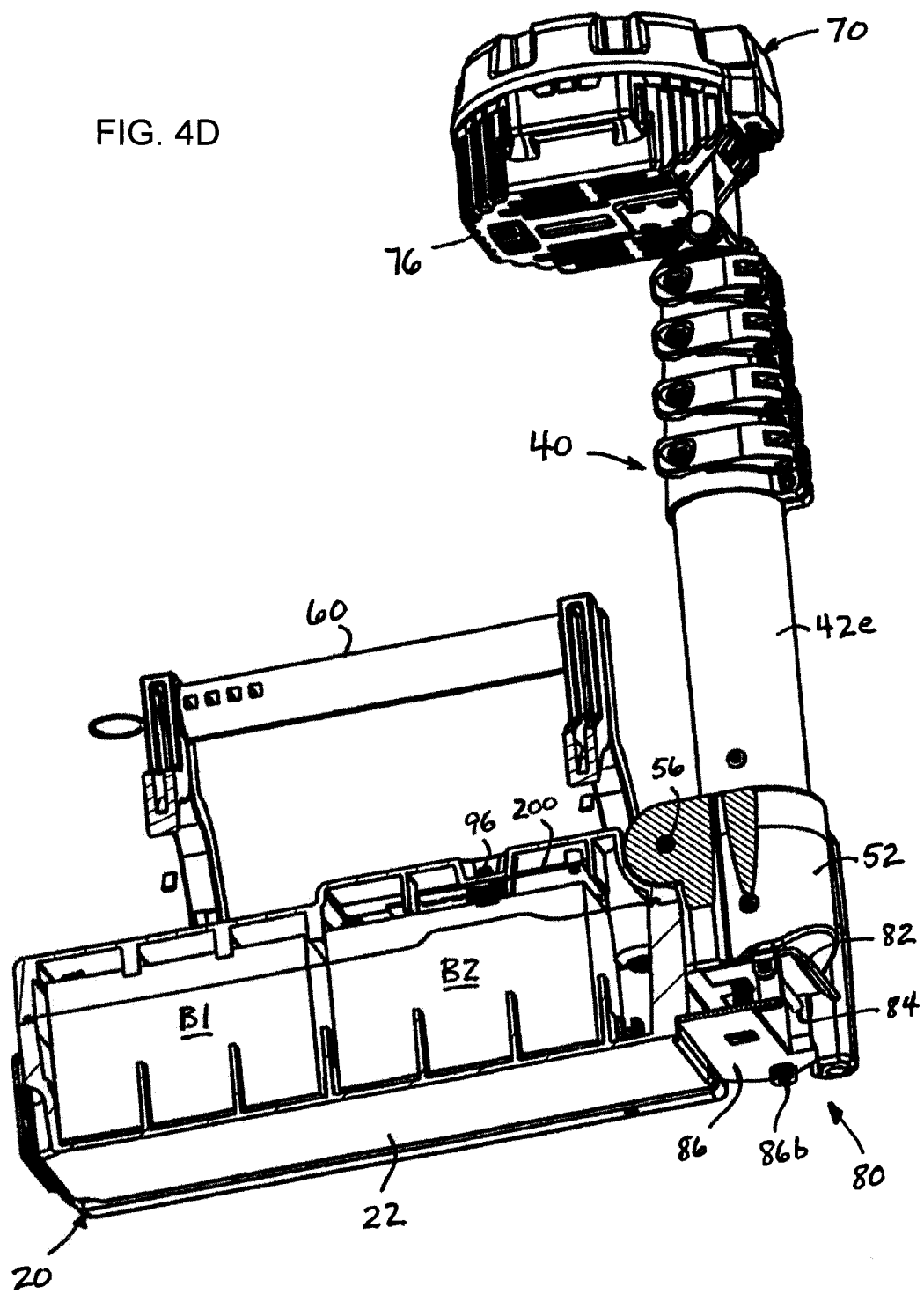
FIG. 4D is a perspective cross-sectional view thereof.
Figure 5A:
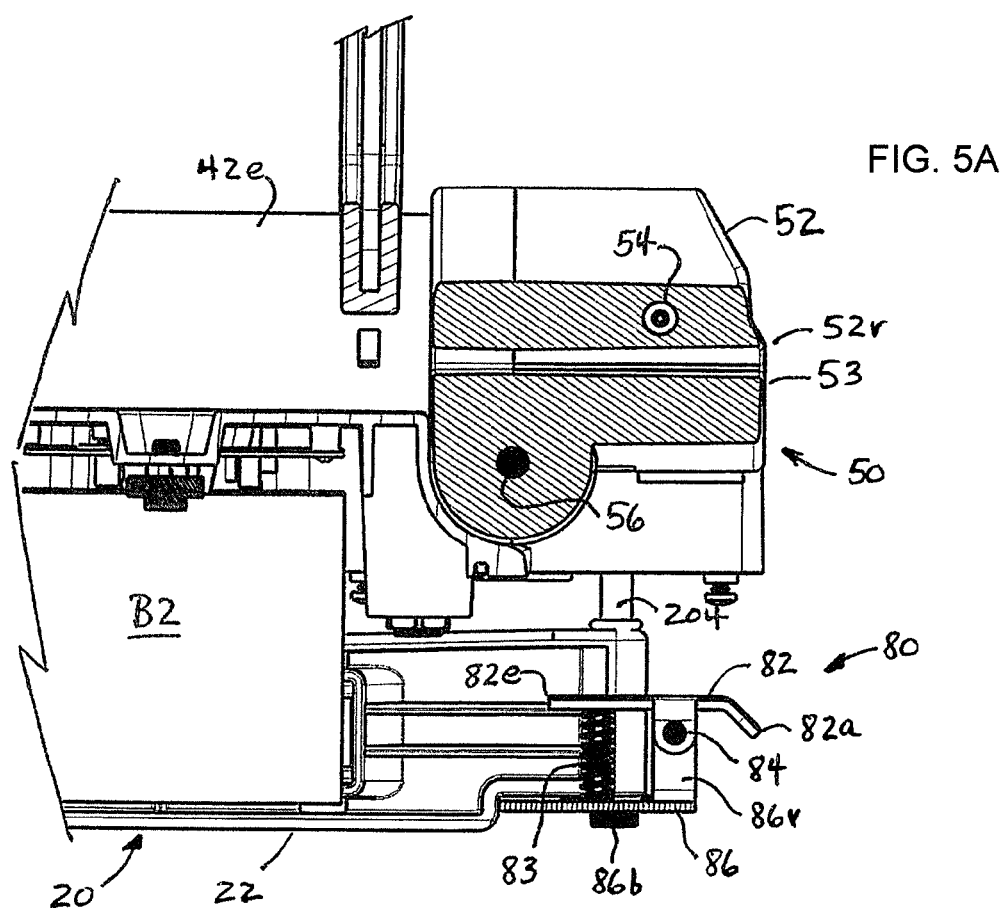
FIGS. 5A, 5B, 5C and 5D are a sequence of enlarged cross-sectional views illustrating the pole pivot, hinge and latch assembly on the base or housing of the example portable light whilst the telescoping pole is being pivoted from a stowed position to an erected and latched position.
Figure 5B:
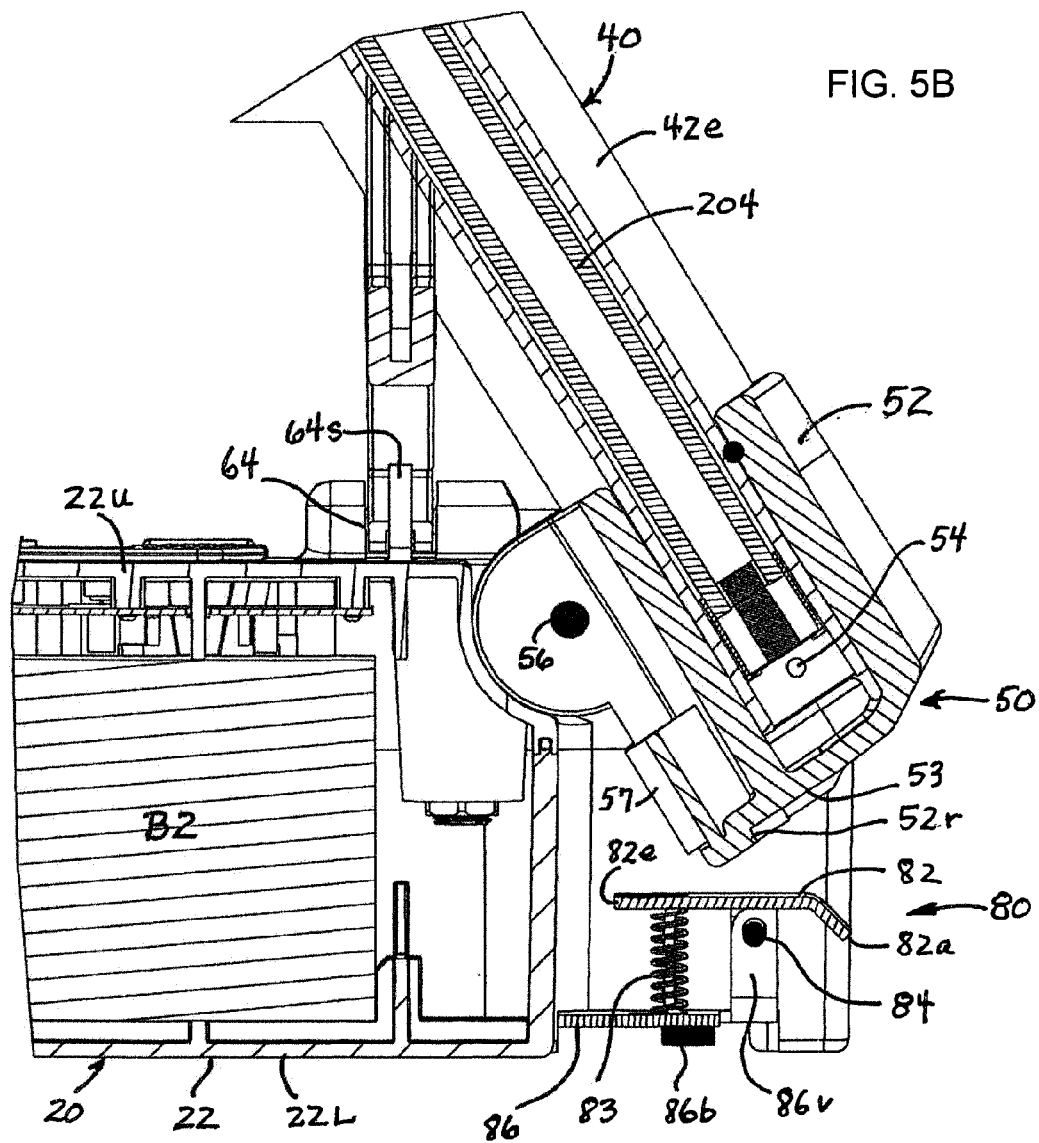
Figure 5C:
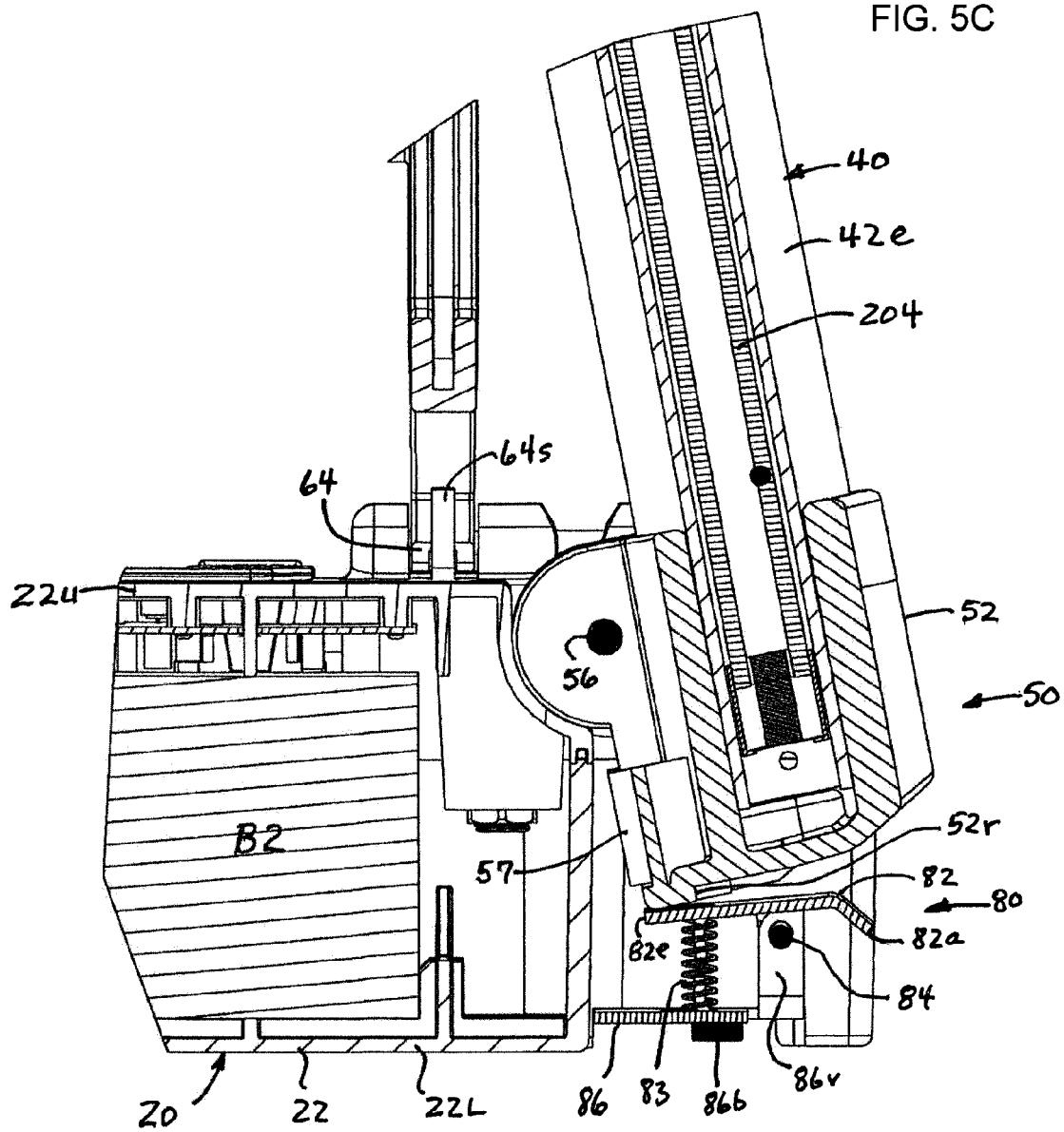
Figure 5D:
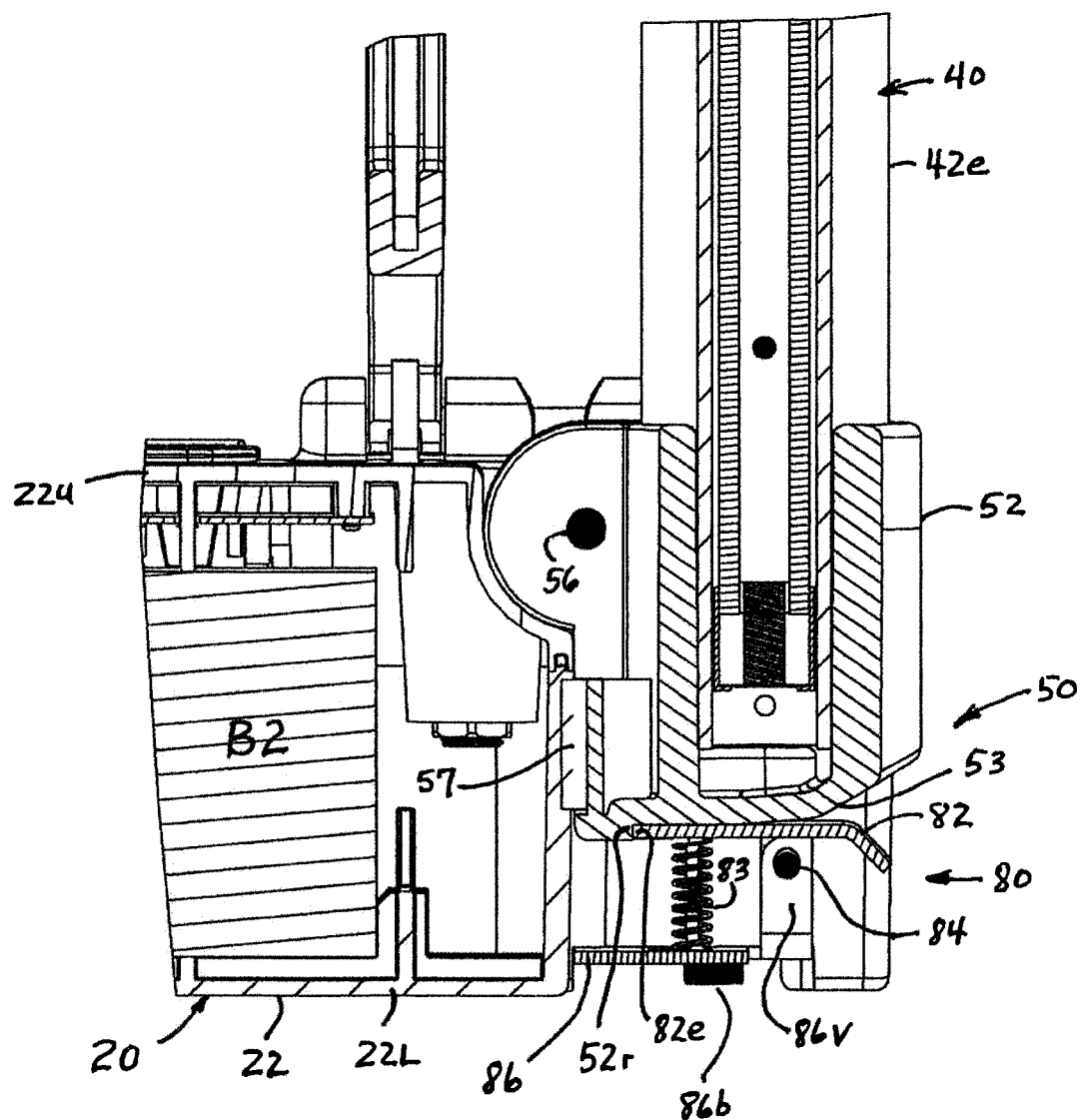

FIGS. 4A and 4B are cross-sectional views of the base or housing 20, 22 of the example portable light 10 with the telescoping pole 40 pivoted to stowed and erected positions, respectively, FIG. 4C is a cross-sectional view of the example portable light 10 and telescoping pole 40 thereof with the telescoping pole 40 pivoted to a stowed position, and FIG. 4D is a perspective cross-sectional view thereof, and FIGS. 5A, 5B, 5C and 5D are a sequence of enlarged cross-sectional views illustrating the pole pivot, hinge and latch assembly 50, 80 on the base or housing 20, 22 of the example portable light 10 whilst the telescoping pole 40 is being pivoted from a stowed position to an erected and latched position. Considering the FIGS. 5A-5C in reverse order may be considered to depict the release of telescoping pole 40 from an erected position toward a less erected or stowed position.

Therein are seen that base 20 includes in housing 22 one or more batteries B1, B2, e.g., two batteries B1, B2, contained therein for powering the one or more light sources of light head 70 under control of electronic circuitry provided on an electronic circuit board 200 also contained in base 20 and control circuitry including in light head 70. The electronic circuitry of circuit board 200 is responsive to actuation of switch 96 for providing electrical power from the internal battery B1, B2 or from input port 90 to light head 70 for enabling the control circuits and light sources thereof to produce light, and operation thereof may be controlled and/or programmed by plural actuations of an actuator, e.g., actuator 74k, e.g., responsive to the rotational position thereof. Alternatively, actuation of light sources 70 may also be controlled by actuation of an electrical switch of light head 70, e.g., by an additional actuator included in knob 74k, including a number of actuations thereof, the timing of actuations thereof, or both the number and the timing of actuations thereof, to control operation of light head 70 into plural different operating conditions.

Extendable mast, e.g., telescoping pole 40, is hinged at the rear of base 20 by pivot and latch assembly 50 so as to be pivotably deployable from its stowed position adjacent to base 20 to its fully deployed position extending essentially perpendicularly upward and away from base 20, e.g., in what is a substantially vertical position when base 20 is placed on a horizontal surface. While telescoping pole 40 is illustrated as being deployed to a fully pivoted position whereat it extends substantially perpendicularly from base 20, it is noted that telescoping pole 40 may be extended without being pivoted away from base 20 or when pivoted to any angle between its stowed position to its fully pivoted position.

Telescoping pole 40 is illustrated in its collapsed condition wherein each of telescoping pole sections 42a-42d is collapsed to be inside of the section 42b-42e having a greater diameter and clamps 44b-44e are essentially abutting each other. Interior pole 40 is seen a coil cable 204 that expands and retracts as telescoping pole 40 is extended and collapsed, and that passes through opening 44o in clamp 44a to connect to light head 70 and through an opening of pole base 52 and opening 22o of housing 22 to connect the circuit board 200 therein. Preferably coil cable 204 includes plural high current carrying conductors so that the voltage loss from the current flowing from batteries B1, B2 to light head 70 is reduced. Handle 60 parts 60a, 60b are preferably biased toward each other by springs 64s of one or more of hinges 64 so as to together provide a handle 60, and handle pin 62 is insertable in and removable from the loops and holes 61 in handle 60, whether telescoping pole 40 is stowed or is pivoted clear of handle 60.

Pole pivot and latch 50 includes a pole base 52 which has a socket, e.g., a cylindrical socket, sized to receive the larger diameter section 42e of telescoping pole 40 which may be secured therein by a fastener 54. Pole fastener 54 may be one or more screws, bolts, pins or other suitable fasteners, and one or more rivet fasteners, e.g., two pop rivets set about 180° apart, are preferred in one embodiment. Pole base 52 has a curved surface 53 that defines a valley and ridge 52r that cooperates with an edge 82e of latch plate 82 to latch pole base 52 in the position wherein telescoping pole 40 is erected substantially perpendicularly from base 20.

Latch assembly 80 includes latch plate 82 that is pivotably mounted 84 on vertical portions 86v of support plate 86 so as to pivot for receiving and releasing ridge 52r of curved surface 53 of pole base 52. Preferably latch plate 82 is permanently pivotably attached to support plate 86 to serve as a pole lock assembly 80, e.g., by a pivot or hinge pin 84 which is retained in position by the ends of pin 84 being adjacent to the opposing sides of recess 28 defined by housing 22, e.g., being in respective blind recesses therein. Support plate 86 of pole lock assembly 80 is attached to base 20, e.g., by bolts or other suitable fasteners 86b, substantially parallel to the bottom of base 20 and with a pair of vertical supports 86v extending upwardly to provide respective openings for receiving the pin 84 on which latch plate 82 pivots. The two bolts 86b may also serve as respective pivots for deployable legs 30, as shown.

Latch plate 82 is biased by spring 83 to pivot edge 82e toward latching ridge 52r when telescoping pole 40 is pivoted to its fully deployed position, e.g., preferably by a snap into place engaging action under the urging of spring 83 and preferably without an operator having to perform any action to make latch 80 to latch. Latch plate 82 has an actuator portion 82a that extends from base 20 sufficiently to be urged, e.g., upward, e.g., by a finger or toe, to pivot latch plate 82 sufficiently for the edge 82e thereof to release ridge 52r of pole base 52 from edge 82e of latch plate 82 and thereby release latch 80 for enabling telescoping pole 40 to be pivoted from its fully deployed position toward its stowed position adjacent base 20. Spring 83, which preferably is a coil spring 83, is typically retained in position by respective tabs or extensions of latch plate 82 and of support plate 86 that extend into the interior of spring 83. Optionally, the actuator extension 82a of latch plate 82 may be made sufficiently large so that it extends so that it could be actuated by a foot, e.g., a boot or shoe toe.

Interior light head 70 may be seen to have an electronic circuit board 78 upon which are disposed plural light emitting diodes (LEDs) and electronic circuitry for the control thereof, e.g., in response to actuator 74k. Preferably actuator 74k is actuatable one or more times for controlling the brightness (light output) thereof, and for changing the characteristics of the beam of light produced by head 70, e.g., between a spot beam and a flood beam and/or other beam shapes. Preferably, circuit board 78 is adjacent to a surface of heat sink 76 for transferring heat thereto, e.g., heat generated by the LEDs.

Following the sequence illustrated in FIGS. 5A-5D in that order illustrates the pivoting (e.g., deployment and/or erection) and latching of telescoping pole 40 into its fully erect position where it extends substantially perpendicularly from base 20. As telescoping pole 40 and pole base 52 therefor are pivoted away from base 20, curved surface 53 of pole base 52 moves closer to latch plate 82 until it makes contact with latch plate 82 (FIG. 5B) which causes the end of latch plate 82 against which spring 83 bears to move downward against the urging of spring 83. When telescoping pole 40 is pivoted to be substantially erect, ridge 52r of curved surface 53 of pole base 52 clears edge 82e of latch plate 82 and latch plate 82 moves upward under the urging of spring 83 to engage ridge 52r, thereby to cause latch 80 to latch pole base 52 and telescoping pole 40 extending therefrom in the fully erected position. Because ridge 52r and edge 82e snap into engagement to provide a latching action, telescoping pole 40 cannot be moved away from its erect position without disengaging latch 80, e.g., disengaging ridge 52r and edge 82e.

It is noted that housing 22 assists the operation and robustness of latch 80 by providing support and constrainment for telescoping pole 40 and latch 80. For example, recess 28 of housing 22 substantially constrains side-to-side movement of pole base 52 and combined with pivot pin 56 constrains telescoping pole 40 and pole base 52 thereof to move only rotationally, e.g., in one degree of freedom. Pivoting of pole base 52 and telescoping pole 40 beyond the fully erect position is substantially limited by pole base 52 contacting the end of recess 28 and pivoting of pole base 52 and telescoping pole 40 away from the fully erect position is substantially limited by latch 80, e.g., by the engagement of ridge 52r and edge 82e. One or more pads 57 or cushions 57 may be provided to further reduce pivoting movement of telescoping pole 40 relative to base 20 when telescoping pole 40 is fully erected and latched. As a result, telescoping pole 40 is substantially stabilized in its fully erect and latched position.

Following the sequence illustrated in FIGS. 5A-5D in the reverse order illustrates the unlatching of telescoping pole 40 and its movement away from its fully erected position toward (but not necessarily reaching) its stowed position. Moving actuator 82a of latch plate 82 upward pivots latch plate 82 on pivot 84 and causes the edge 82e to move downward and to disengage edge 82e of latch plate 82 from ridge 52r of pole base 52 which releases latch 80 and permits telescoping pole 40 to be pivoted away from the fully erect position towards the stowed position.

Figure 6A:
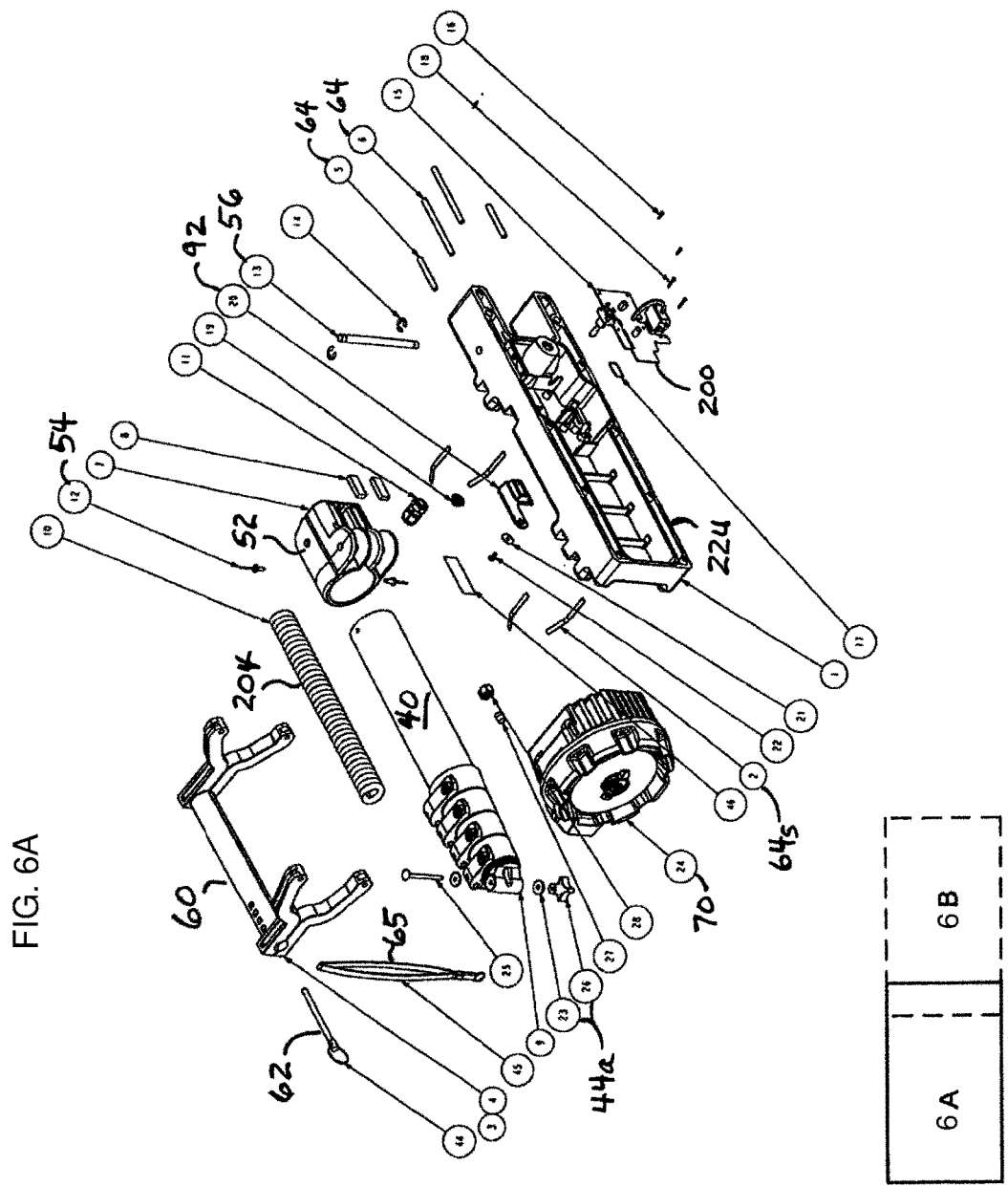
FIGS. 6A and 6B together provide on two sheets a single exploded view of the example light of FIG. 1.
Figure 6B:
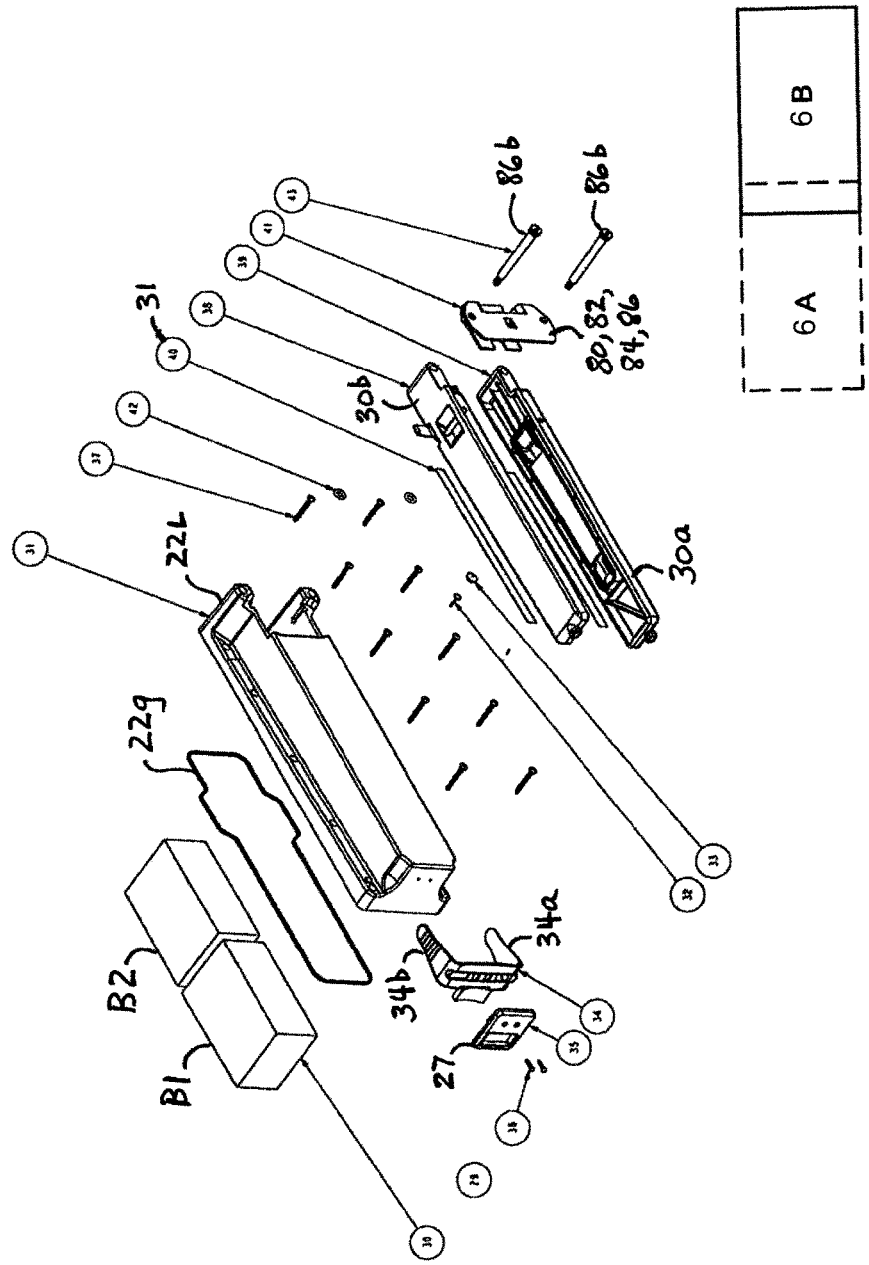

FIG. 6 is an exploded view of the example light 10 of FIG. 1 showing various parts and components thereof including internal elements, the view being in two parts A and B that span two sheets as indicated by the icon on each sheet. Table A contains a tabular listing of various parts and components of light 10 along with their item numbers in this Application and their circled item numbers in the Figure:

TABLE A

LISTING OF PARTS OF PORTABLE LIGHT 10

| Drawing Item No. | Application Item No. | Nomenclature |
|---|---|---|
| 1 | $22_U$ | Upper housing, upper body |
| 2 | 64s | Handle spring |
| 3 & 4 | 60a, 60b | Handle parts, right and left |
| 5 & 6 | 64 | Handle hinge pin |
| 7 | 52 | Pole base |
| 8 | 57 | Clamp pad |
| 9 | 40 | Telescoping pole assembly |
| 10 | 204 | Coil cable (interior to pole 40) |
| 11 | — | Connector (liquid tight) |
| 12 | 54 | Rivet (pole base) |
| 13 | 56 | Hinge pin, pivot pin |
| 14 | — | Retainer clip (for Hinge pin) |
| 15 | 200 | Circuit Board; Charger assembly |
| 16 | — | Fastener (screw) |
| 17 | — | Charge port seal |
| 18 | 90 | Charger contact (screw) |
| 19 | 96 | Toggle switch boot |
| 20 | 92 | Charge port cover |
| 21 | — | Washer |
| 22 | — | Fastener (screw) |
| 23, 25-26 | 44a | Fastener (for clamp) |
| 24 | 70 | Light source; head assembly |
| 27-28 | — | Grommet & nut |
| 29 | 22g | Seal; gasket |
| 30 | B1, B2 | Battery |
| 31 | $22_L$ | Lower housing; lower body |
| 32-33 | — | Vent valve & plug |
| 34 | 34a, 34b | Leg loop latch; Rubber pull band |
| 35-36 | 27 | Leg loop plate & Fastener |
| 37, 42 | — | Fastener (housing bolt); Seal (O-ring assembly) |
| 38, 39 | 30a, 30b, 32 | Leg & brace; Leg |
| 40 | 31 | Reflector tape |
| 41 | 80, 82, 86 | Pole latch, Pole lock assembly |
| 43 | 86b | Fastener (bolt) |
| 44 | 62 | Release pin (handle pin with split ring) |
| 45 | 65 | Lanyard (with split ring) |
| 46 | — | Product label |

Coil cable 204 is visible interior to telescoping pole 40 in the cross-section of Section A-A thereof. Fasteners in the foregoing table may include, e.g., screws, bolts, pins, rivets, C or E clips, or another suitable fastener, whether described by a generic term, e.g., fastener, or by a more specific term.

Figure 7A:
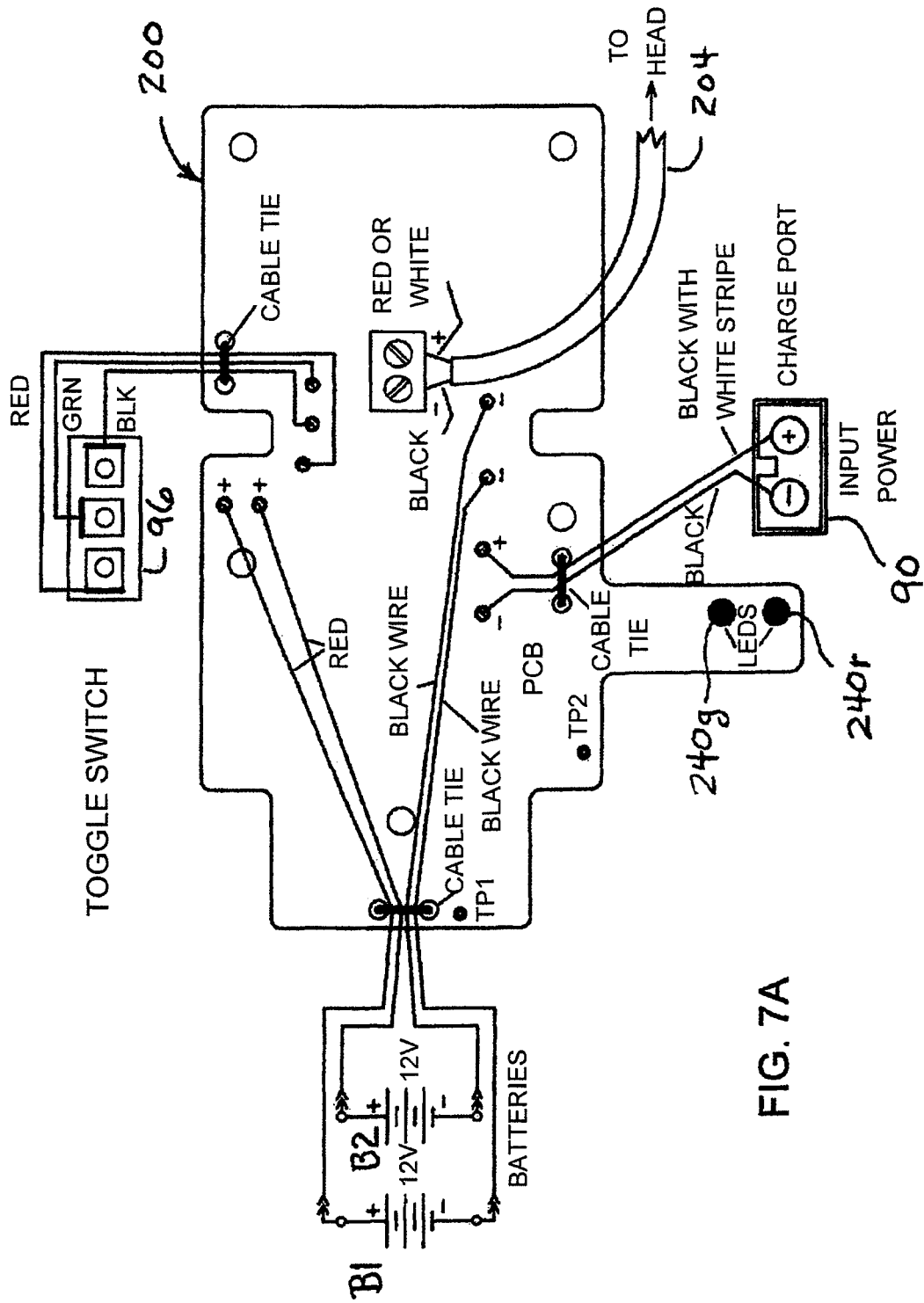
FIGS. 7A and 7B are electrical diagrams illustrating the electronic circuitry and operation of the example portable light embodiments described herein.
Figure 7B:
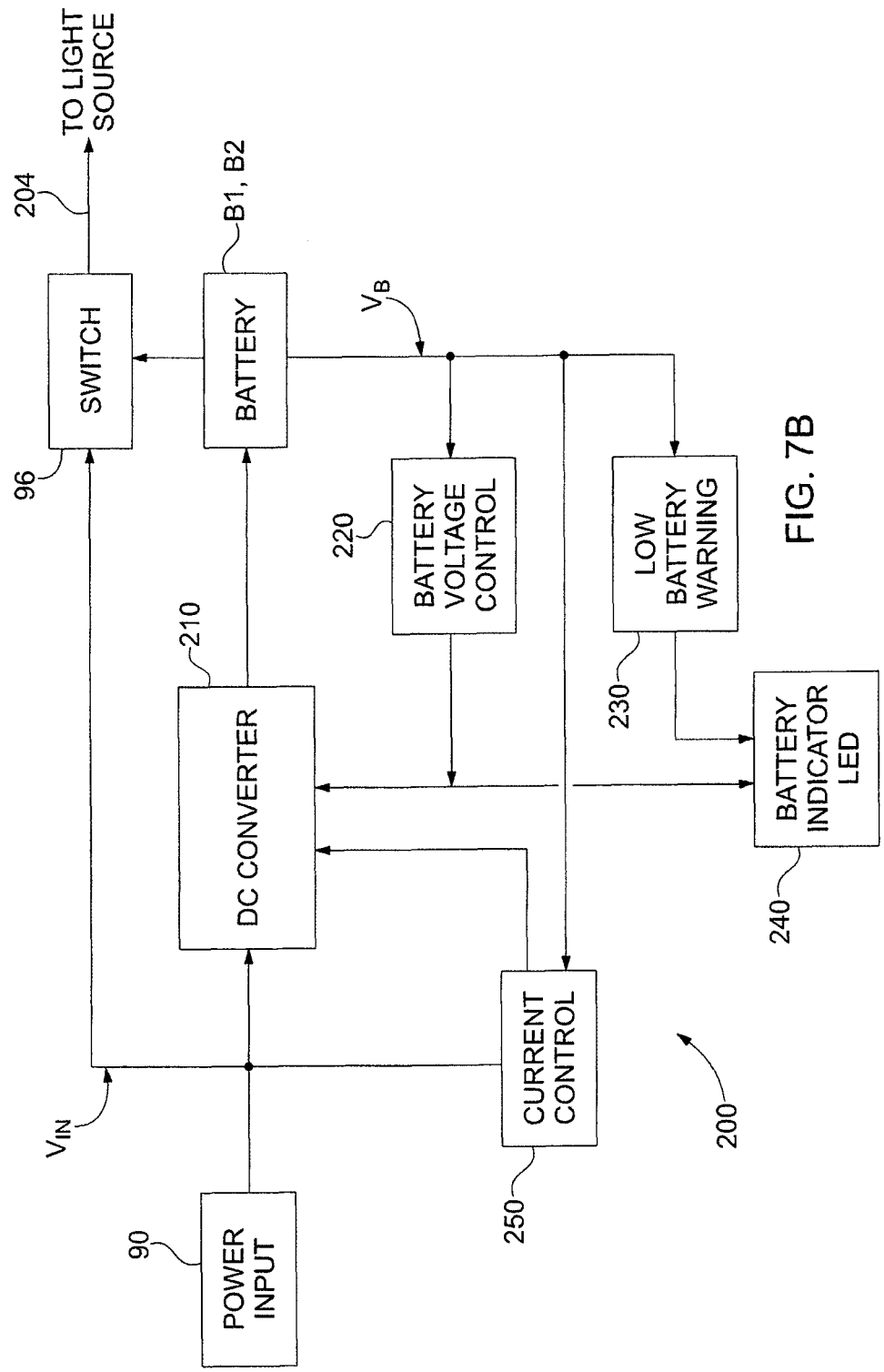

FIGS. 7A and 7B are electrical diagrams illustrating the electronic circuitry 200 and operation of the example portable light embodiments 10 described herein. In the relatively physical arrangement of FIG. 7A is shown circuit board 200 to which are connected batteries B1, B2, input power port 90, toggle switch 96, and coil cable 204 which connects to light head 70. Batteries B1, B2, input power port 90, and toggle switch 96, connect via wires connected to terminal locations on circuit board 200, e.g., by soldering, and coil cable 204 connects to circuit board 200 at a screw terminal block. Circuit board 200 supports charge indicator 240, e.g., a red LED 240g and a green LED 240g, which indicate the charge status of the one or more batteries B1, B2 which may be connected in parallel.

In the example flow diagram of FIG. 7B are seen again batteries B1, B2, input power port 90, toggle switch 96, and coil cable 204 which connects to light head 70, and connections thereto to electronic circuitry disposed on circuit board 200. At its center position, toggle switch 96 preferably disconnects both batteries B1, B2 and input power connector 90 from light head 70 so that the light sources 70 will be OFF. In one actuated position toggle switch 96 connects batteries B1, B2 to light head 70 and in the other actuated position, toggle switch 96 connects light head 70 to input power port 90.

Preferably, input power port 90 is continuously connected to DC converter 210 which provides DC charging power to batteries B1, B2, so that the batteries will be charging whenever electrical power is available at charging port 90. Sources of electrical power thereat may include a vehicle power system, a power block that plugs into an AC power source, and/or any other suitable source of DC power at a suitable voltage, e.g., a voltage between about 9 and 20 volts in one example embodiment. Current control 250 preferably controls DC converter 210 such that excessive current is not drawn via input power source 90, e.g., typically by monitoring the voltage VIN thereat or the input current or both.

The voltage of battery B1, B2 is monitored by battery voltage control 220 for controlling the charging of batteries B1, B2 by limiting the charging voltage and/or charging current thereof to be within predetermined safe limits. Battery voltage control 220 preferably also outputs signals that illuminate indicator 240, e.g., red and green LEDs 240r and 240g, to indicate the charge status of batteries B1, B2 when charging current is applied thereto. In one example arrangement, red LED 240r is illuminated when batteries B1, B2 are at less than full charge and are being charged and green indicator 240g is illuminated when batteries B1, B2 have reached full charge. Also preferably, the voltage of battery B1, B2 is also monitored by low battery warning 230 which outputs signal that illuminate indicator 240, e.g., green LED 240g, to indicate the that charge level of batteries B1, B2 is approaching a fully discharged condition, e.g., preferably providing a low charge warning about 15-20 minutes in advance of substantial depletion or batteries B1, B2.

Figure 8A:
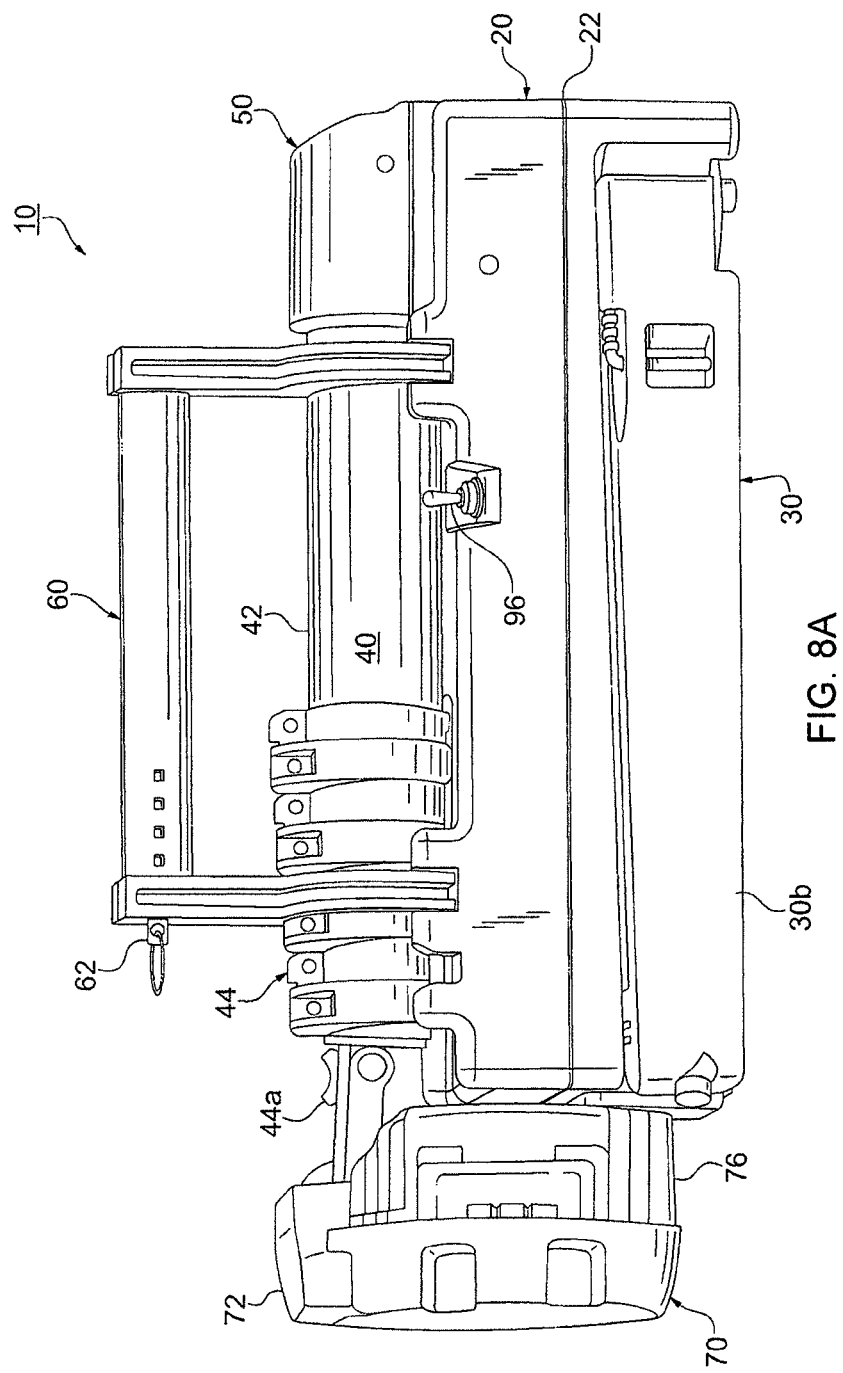
FIGS. 8A-8I illustrate various views and details relating to the example portable light 10 as described herein.
Figure 8B:
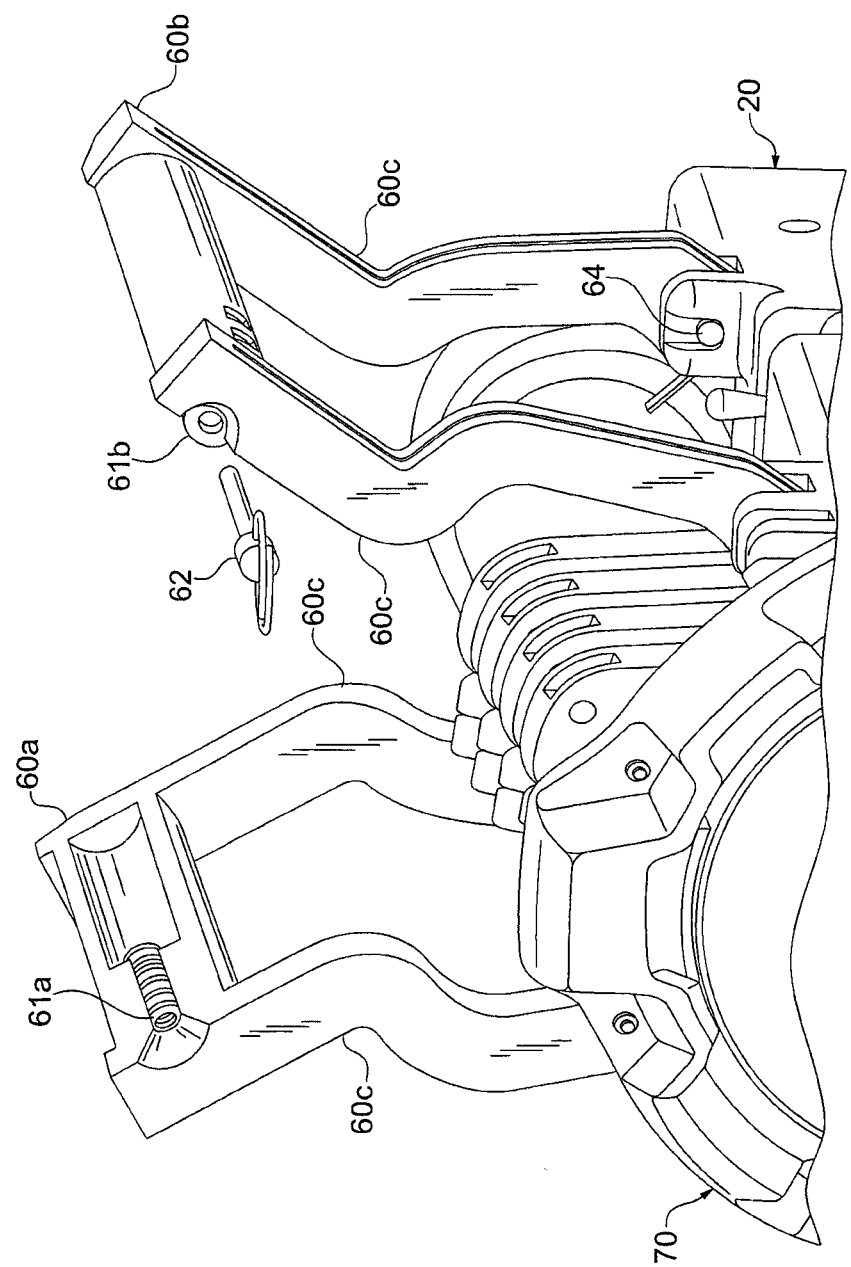
Figure 8C:
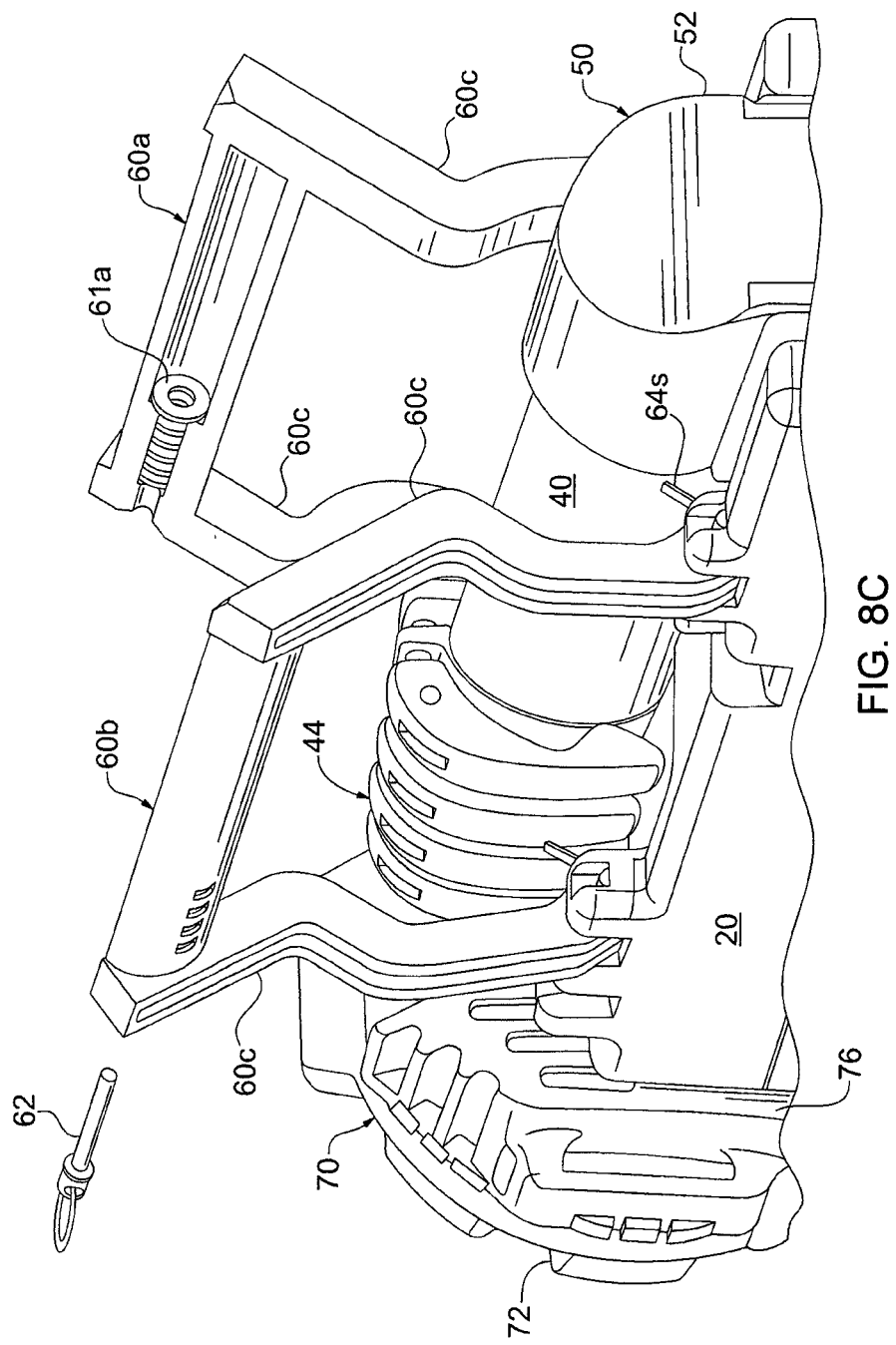
Figure 8D:
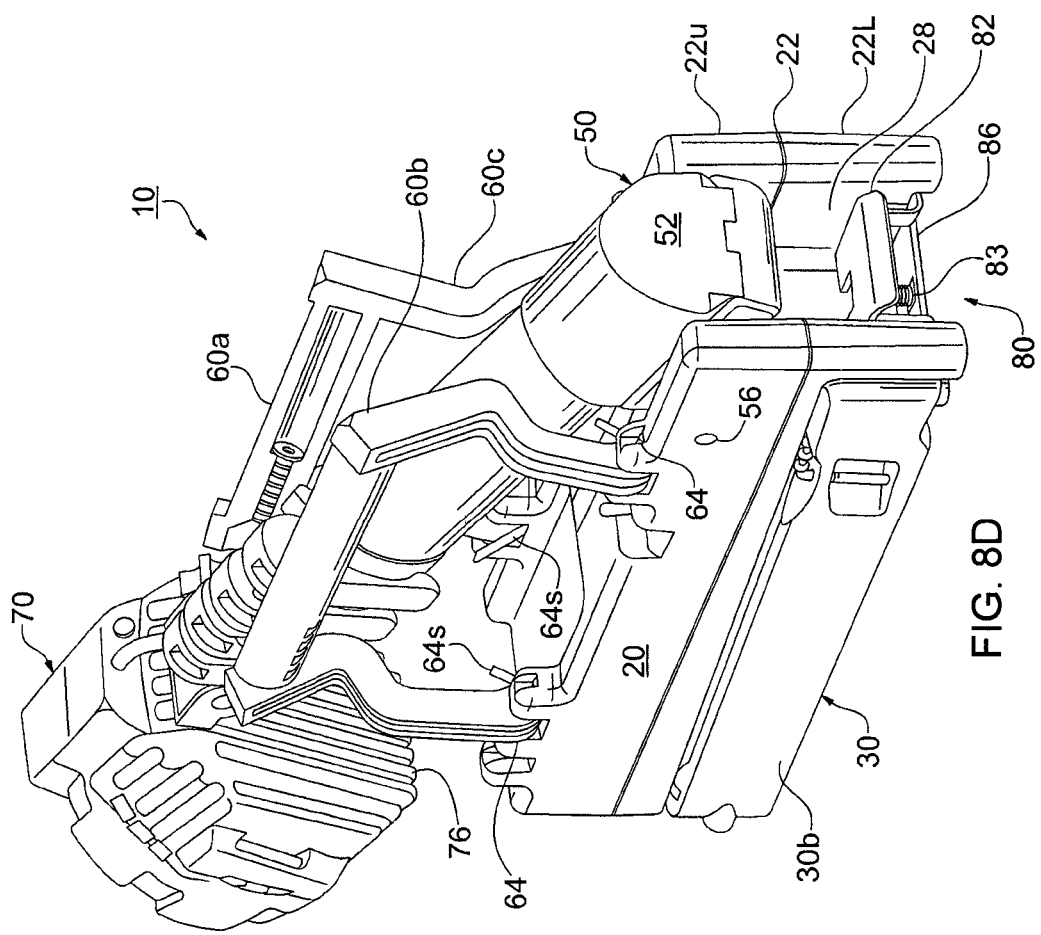
Figure 8E:
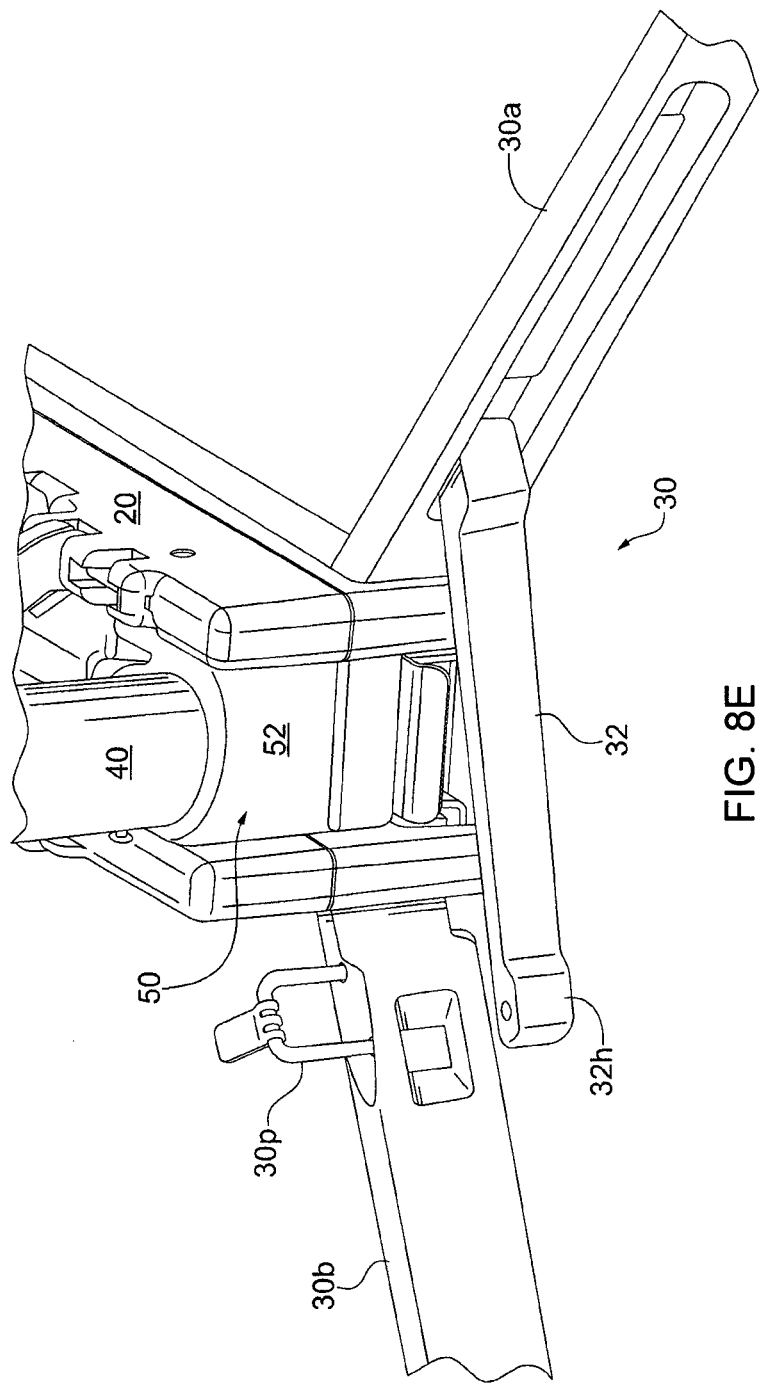
Figure 8F:
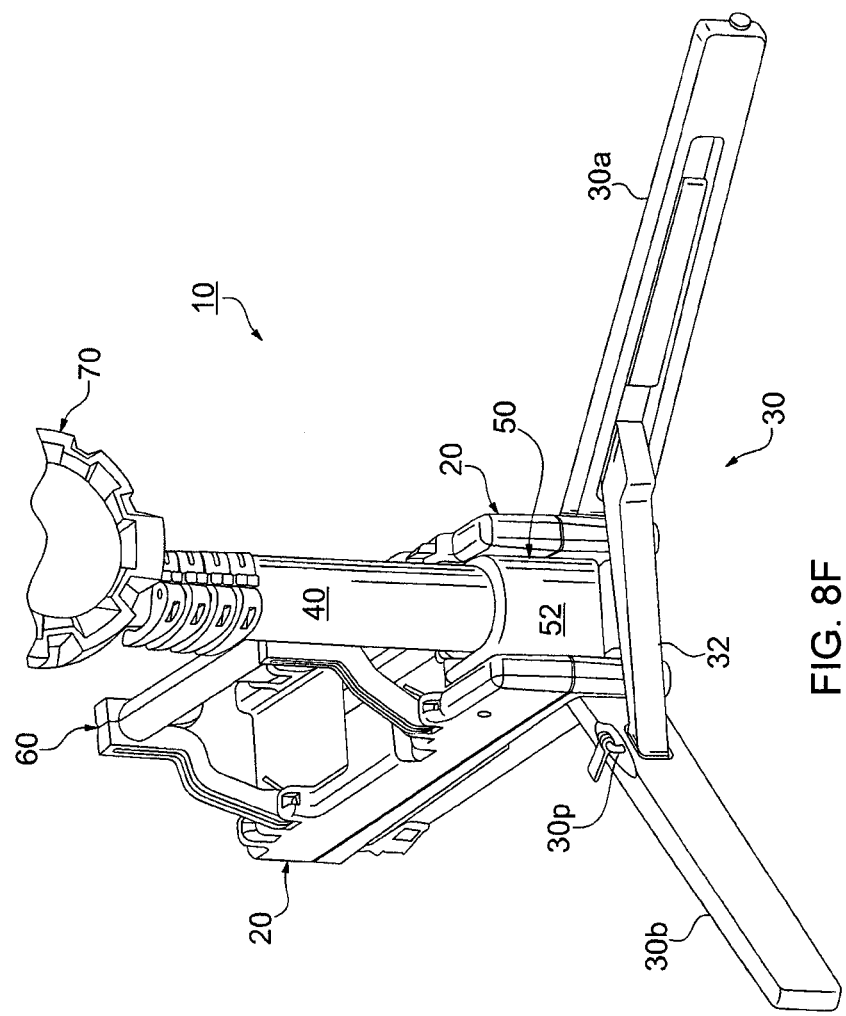
Figure 8G:
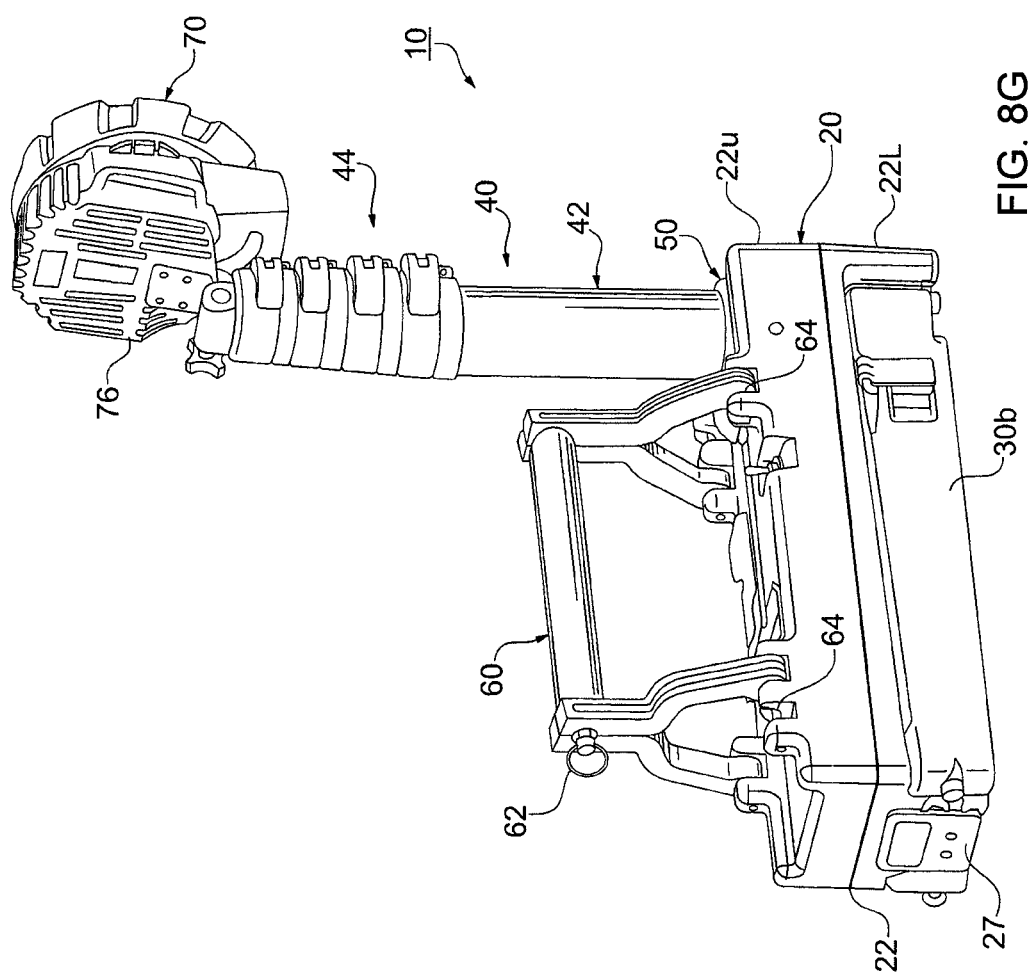
Figure 8I:
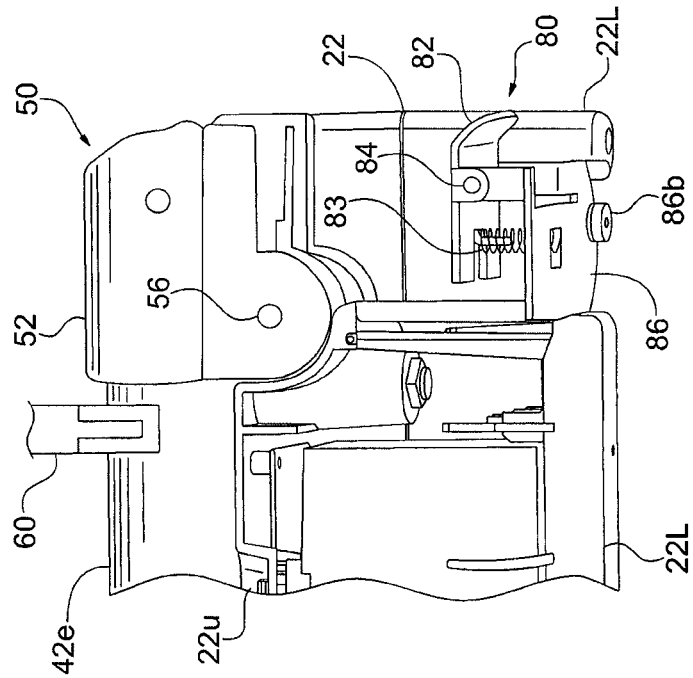
Figure 8H:
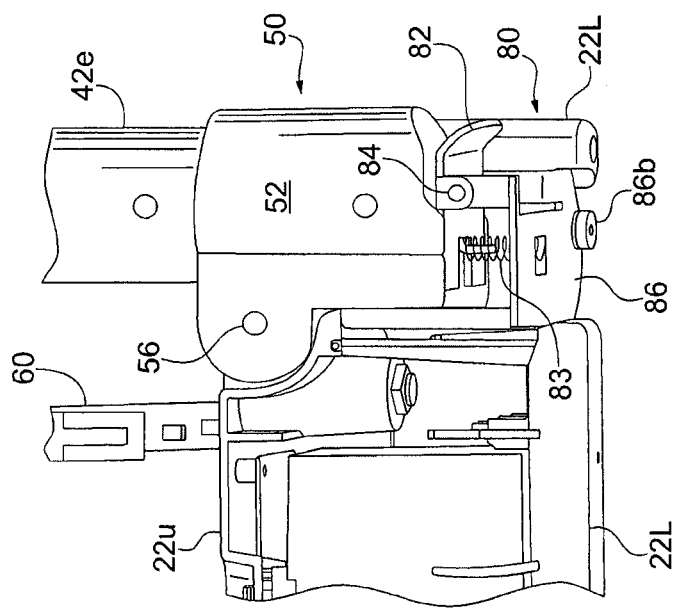

FIGS. 8A-8I illustrate various views and details relating to the example portable light 10 described herein including: FIG. 8A which shows a fully stowed configuration of the example portable light 10, FIGS. 8B-8D which show partially deployed configurations relating to the split handle 60 arrangement of the example portable light 10 and its operation, FIGS. 8E-8F which show partially and fully deployed configurations of the deployable legs 30, 30a, 30b, of the example portable light 10, FIG. 8G which shows a configuration of the example portable light 10 wherein extendable pole or mast 40 is in an erected, but not extended, configuration, and FIGS. 8H-8I which show details of telescoping pole pivot 50 and latch assembly 80 with the mast assembly 40 of the example portable light 10 in deployed and stowed configurations, respectively. Descriptions of the embodiments illustrated in FIGS. 8A-8I are presented above in relation to FIGS. 1-5.

In one typical example embodiment, housing 22, legs 30, brace 32, split ring clamps 44a-44e, pole base 52, and handle 60, may be metal, e.g., aluminum or steel, or may be a plastic, e.g., a nylon, engineered nylon, ABS, PVC, PC-PET alloys, PC-nylon alloys, polyethylene, reinforced plastic, polypropylene, polycarbonate, polyester, or a blend thereof. Telescoping pole 40 may be of a metal, e.g., an aluminum or a steel, or of any other suitable material, or a fiberglass or reinforced plastic, and/or may be coated with a coating that is not electrically conductive, e.g., hard coat anodizing, aluminum oxide, or powder coating. Latch plate 82, spring 83, hinge pin 56, fasteners, and other mechanical parts may be of a metal, e.g., an aluminum or a steel or a stainless steel. Leg latches 34 may be a loop of any suitable flexible stretchable material, e.g., a plastic, elastomer, or rubber loop, and may be attached to housing 22 by a plate 27 and fastener which may be a metal or a plastic. The lanyard for handle pin 62 may be of any suitable cord, woven or elastomeric material, e.g., a woven or braided cotton or nylon strap or cord, or a silicone, or other elastomeric material. Fasteners may include, e.g., screws, bolts, pins, rivets, pop-rivets, C or E clips, or any other suitable fasteners.

Batteries B1, B2 may be rechargeable lead acid batteries, preferably sealed rechargeable lead acid batteries, that provide about 12 volts and suitable capacity. In one example, batteries B1, B2 are rechargeable batteries having 7.2 ampere hour capacity. In one embodiment wherein light head 70 includes six high output white LEDs, and with two 12-v. lead acid batteries operated in parallel, light 10 may typically provide about 3600 lumens for about 4 hours, or about 2400 lumens for about 8 hours, or about 1100 lumens for about 16 hours, depending on the level of light output selected by an operator. Selection thereof may be by rotating or pressing or otherwise actuating knob 74k. In a preferred embodiment, coil cord 204 is a heavy duty, high durability, high current, high temperature coiled cable having two #16 AWG stranded wire conductors, and is highly flexible, being extendible to about five times its retracted length.

In one typical embodiment, portable light 10 has a base that is about 18 inches (about 45.7 cm) long, about 5 inches (about 12.7 cm) wide and about 6 inches (about 15.2 cm) high, and weighs about 25 pounds (about 11.4 kg) with batteries. One typical telescoping pole 40 is about 1.5-2 inches (about 3.8-5 cm) in diameter and about 16 inches (about 40.6 cm) in length when collapsed, and extends to up to about 60 inches (about 152 cm) in length so as to position light head 70 about 72 inches (about 183 cm) above the surface on which light 10 is placed.

Examples of a suitable light head 70 are described and shown, e.g., in US Provisional Patent Application No. 61/815,561 entitled "PORTABLE LIGHT" filed on Apr. 24, 2013, now U.S. patent application Ser. No. 14/260,369 entitled "PORTABLE LIGHT" filed on Apr. 24, 2014, and in U.S. patent application Ser. No. 12/948,285 entitled "PORTABLE LIGHT HAVING A HEAT DISSIPATER WITH AN INTEGRAL COOLING DEVICE" filed on Nov. 17, 2010, published as US Patent Publication No. 2011/0121727, each of which is hereby incorporated herein by reference in its entirety.

A portable light 10 may comprise: a base 20 including a source of electrical power; one or more deployable legs 30 supported by the base 20 and deployable for being adjacent to and/or resting on a surface on which the base 20 is placed; an extendable pole 40 pivotably supported by the base 20, the extendable pole 40 being collapsible and pivotable to a stowed position adjacent the base 20 and extendable to a deployed position extending from the base 20; and a light source 70 supported at the end of the extendable pole 40 distal the base 20. The one or more deployable legs 30 may be pivotably supported on the base 20 and may be pivotably deployable to extend from the base 20. Two deployable legs 30 may be deployable to define with the base 20 three legs of a tripod. The one or more deployable legs 30 may include a brace for maintaining the one or more legs 30 in predetermined positions. The extendable pole 40 may include: a plurality of telescoping sections; or one or more clamps for maintaining the extendable pole 40 in an extended configuration; or a plurality of telescoping sections and one or more clamps for maintaining the telescoping sections of the extendable pole 40 in an extended configuration. The extendable pole 40 may have a hollow interior and one or more electrical conductors may be disposed in the hollow interior of the extendable pole 40 for connecting the source of electrical power to the light source 70; or a coil cable including one or more electrical conductors may be disposed in the hollow interior of the extendable pole 40 for connecting the source of electrical power to the light source 70. The portable light 1 may further comprise: a handle 60 on the base 20; or a split handle 60 on the base 20 including separable first and second handle parts 60a, 60b that provide a handle 60 and together may be closable over the extendable pole 40 when the extendable pole 40 is pivoted to be in the position adjacent the base 20 and that separate for enabling the extendable pole 40 to be pivoted relative to the base 20. The split handle 60 may include: one or more springs for urging the first and second handle parts 60a, 60b to move together to define the split handle 60; or a handle pin disposable in respective openings of the first and second handle parts 60a, 60b for retaining the first and second handle parts 60a, 60b together to define the handle 60; or one or more springs for urging the first and second handle parts 60a, 60b to move together to define the split handle 60 and a handle pin disposable in respective openings of the first and second handle parts 60a, 60b for retaining the first and second handle parts 60a, 60b together to define the handle 60. The extendable pole 40 may include a plurality of telescoping sections and one or more clamps for maintaining the telescoping sections of the extendable pole 40 in a collapsed or an extended configuration, and the base 20 may include a recess shaped for receiving at least an outer one of the telescoping sections and the one or more clamps therein when the separable first and second handle parts 60a, 60b are together for retaining the extendable pole 40 in the position adjacent the base 20. The portable light 10 may further comprise a latch 80 having a latch plate 82 that moves into engaging relation with a base 52 of the telescoping pole 40 when the telescoping pole 40 is pivoted to an erected position relative to the base 20, the latch plate 82 being movable to release the telescoping pole 40 to move away from the erected position. The light source 70 may include: plural light emitting diodes operable to produce light at a plurality of levels; or an actuator 74k that is actuatable for defining beams of light including at least a spot beam and a flood beam; or plural light emitting diodes operable to produce light at a plurality of levels and an actuator 74k that is actuatable for defining beams of light including at least a spot beam and a flood beam.

A portable light 10 may comprise: a base 20 including a source of electrical power; a pole 40 pivotably supported by the base 20, the pole 40 being pivotable to a position adjacent the base 20 and pivotable to a position extending from the base 20; a split handle 60 on the base 20 including separable first and second handle parts 60a, 60b that provide a handle 60 and together may be closable over the pole 40 when the pole 40 is pivoted to be in the position adjacent the base 20 and that separate for enabling the pole 40 to be pivoted relative to the base 20; and a light source 70 supported at the end of the pole 40 distal the base 20. The split handle 60 may include: one or more springs for urging the first and second handle parts 60a, 60b to move together to define the split handle 60; or a handle pin disposable in respective openings of the first and second handle parts 60a, 60b for retaining the first and second handle parts 60a, 60b together to define the handle 60; or one or more springs for urging the first and second handle parts 60a, 60b to move together to define the split handle 60 and a handle pin disposable in respective openings of the first and second handle parts 60a, 60b for retaining the first and second handle parts 60a, 60b together to define the handle 60. The portable light 10 may further comprise: one or more deployable legs 30 supported by the base 20 and deployable for being adjacent to and/or resting on a surface on which the base 20 is placed; or one or more deployable legs 30 pivotably supported on the base 20 and pivotably deployable to extend from the base 20 for being adjacent to and/or resting on a surface on which the base is placed. The portable light of claim 3 wherein two deployable legs 30 may be deployable to define with the base 20 three legs of a tripod. The one or more deployable legs 30 may include: a brace for maintaining the one or more legs 30 in predetermined positions. The pole 40 may include: an extendable pole 40 pivotably supported by the base 20, the extendable pole 40 being collapsible and pivotable to a stowed position adjacent the base 20 and extendable to a deployed position extending from the base 20. The extendable pole 40 may include: a plurality of telescoping sections; or one or more clamps for maintaining the extendable pole 40 in an extended configuration; or a plurality of telescoping sections and one or more clamps for maintaining the telescoping sections of the extendable pole 40 in an extended configuration. The base 20 may include a recess shaped for receiving at least an outer one of the telescoping sections and the one or more clamps therein when the separable first and second handle parts 60a, 60b may be together for retaining the extendable pole 40 in the position adjacent the base 20. The extendable pole 40 may have a hollow interior and one or more electrical conductors may be disposed in the hollow interior of the extendable pole 40 for connecting the source of electrical power to the light source 70; or a coil cable including one or more electrical conductors may be disposed in the hollow interior of the extendable pole 40 for connecting the source of electrical power to the light source 70. The portable light 10 may further comprise a latch 80 having a latch plate 82 that moves into engaging relation with a base 52 of the pole 40 when the pole 40 is pivoted to an erected position relative to the base 20, the latch plate 82 being movable to release the pole 40 to move away from the erected position. The light source 70 may include: plural light emitting diodes operable to produce light at a plurality of levels; or an actuator 74k that is actuatable for defining beams of light including at least a spot beam and a flood beam; or plural light emitting diodes operable to produce light at a plurality of levels and an actuator 74k that is actuatable for defining beams of light including at least a spot beam and a flood beam.

A portable light may comprise: a base 20 including a source of electrical power; one or more deployable legs 30 pivotably supported on the base 20 and pivotably deployable to extend from the base 20 for being adjacent to and/or resting on a surface on which the base 20 is placed; an extendable pole 40 pivotably supported by the base 20, the extendable pole 40 being extendable and collapsible and pivotable into and out of a stowed position adjacent the base 20 and extendable to a deployed position extending from the base 20; the extendable pole 40 including a plurality of telescoping sections and one or more clamps for maintaining the telescoping sections of the extendable pole 40 in an extended configuration; a split handle 60 on the base 20 including separable first and second handle parts 60a, 60b that provide a handle 60 and together may be closable over the extendable pole 40 when the extendable pole 40 is pivoted to be in the position adjacent the base 20, wherein the first and second separable handle parts 60a, 60b separate for enabling the extendable pole 40 to be pivoted relative to the base 20; and a light source 70 supported at the end of the extendable pole 40 distal the base 20, whereby the portable light 10 is configurable as a lantern 10 when the extendable pole 40 is stowed and as a work light 10 when the extendable pole 40 is deployed and/or extended. Two deployable legs 30 may be deployable to define with the base 20 three legs of a tripod, and may include a brace for maintaining the two deployable legs 30 in predetermined positions. The first and second separable handle parts 60a, 60b may be movable to be separated by the extendable pole 40 being pivoted to bear against the first and second separable handle parts 60a, 60b wherein the first and second separable handle parts 60a, 60b may include one or more springs for moving the first and second separable handle parts 60a, 60b together when the first and second separable handle parts 60a, 60b are not separated by the extendable pole 40. The portable light 10 may further comprise a latch 80 having a latch plate 82 that moves into engaging relation with a base 52 of the extendable pole 40 when the extendable pole 40 may be pivoted to an erected position relative to the base 20, the latch plate 82 being movable to release the extendable pole 40 to move away from the erected position.

A portable light 10 may comprise: a base 20 including a source of electrical power and having a bottom surface configured for being placed upon a supporting surface; a light source 70 supported by the base 20; an electrical switch 96 connecting the light source 70 to the source of electrical power for selectively energizing the light source 70 to produce light; at least two deployable legs 30, 30a, 30b pivotably supported on the base 20, the at least two deployable legs 30, 30a, 30b being pivotably deployable to extend away from the base 20 and adjacent to the supporting surface on which the bottom surface of the base 20 is placed when the portable light is placed on the supporting surface; and a brace 32 supported at a first end by one of the deployable legs 30, 30a, 30b and having a second end configured for engaging a second one of the deployable legs 30, 30a, 30b, whereby the brace 32 when engaged substantially fixes the at least two deployable legs 30, 30a, 30b in predetermined deployed positions extending away from the base 20, whereby the at least two deployable legs 30, 30a, 30b when deployed and connected by the brace 32 cooperate with the bottom surface of the base 20 to define a three leg tripod-like structure for the portable light. The at least two deployable legs 30, 30a, 30b may be pivotable about a pivot axis that is substantially perpendicular to the bottom surface of the base 20, whereby the at least two deployable legs 30, 30a, 30b may be pivotably deployable in a plane that is substantially parallel to the bottom surface of the base 20. The brace 32: may be pivotably supported by the one of the deployable legs 30, 30a, 30b; or may be stowable in a recess in the one of the deployable legs 30, 30a, 30b; may be pivotably supported by the one of the deployable legs 30, 30a, 30b and may be stowable in a recess in the one of the deployable legs 30, 30a, 30b. The second one of the deployable legs 30, 30a,

30*b* may include a pin for engaging the second end of the brace 32; or the second end of the brace 32 has a hole for engaging the second one of the deployable legs 30, 30*a*, 30*b*; or the second one of the deployable legs 30, 30*a*, 30*b* may include a pin for engaging a hole in the second end of the brace 32. The pin may be a U-shaped pin; or the pin may be captive on the second one of the deployable legs; or the pin may be a U-shaped pin that is captive on the second one of the deployable legs. The portable light of claim 1 wherein: the base may have at least two recesses configured to receive the at least two deployable legs when the at least two deployable legs are in a stowed position; or the base may have at least two fasteners configured to retain the at least two deployable legs adjacent the base when the at least two deployable legs are in the stowed position; or the base may have at least two recesses configured to receive the at least two deployable legs when the at least two deployable legs are in the stowed position and may have at least two fasteners configured to retain the at least two deployable legs in the two recesses when the at least two deployable legs are in the stowed position. The light source 70 supported by the base 20 may include a pole supported at a first end by the base 20 and supporting the light head at a second end thereof. The pole may be an extendable pole including: a plurality of telescoping sections; or one or more clamps for maintaining the extendable pole in an extended configuration; or a plurality of telescoping sections and one or more clamps for maintaining the telescoping sections of the extendable pole in an extended configuration. The pole may be an extendable pole having a hollow interior and wherein: one or more electrical conductors disposed in the hollow interior of the extendable pole connect the source of electrical power to the light source 70; or a coil cable including one or more electrical conductors disposed in the hollow interior of the extendable pole connects the source of electrical power to the light source 70. The pole may be pivotably supported at a first end by the base 20, and light 10 may further comprise: a split handle on the base 20 including separable first and second handle parts that may be pivotably attached to the base 20 to provide a handle when pivoted together, wherein the first and second handle parts may be pivotable together for retaining the pole when the pole is pivoted to be in a position adjacent the base 20 and may be pivotable apart for enabling the pole to be pivoted relative to the base 20. The split handle may include: one or more springs for urging the first and second handle parts to move together, thereby to define the handle; or a handle pin disposable in respective openings of the first and second handle parts for retaining the first and second handle parts together, thereby to define the handle; or one or more springs for urging the first and second handle parts to move together and a handle pin disposable in respective openings of the first and second handle parts for retaining the first and second handle parts together, thereby to define the handle. The pole may be an extendable pole including a plurality of telescoping sections and one or more clamps for maintaining the telescoping sections of the extendable pole in a collapsed or an extended configuration, wherein the base 20 may include a recess shaped for receiving at least an outer one of the telescoping sections and the one or more clamps therein when the separable first and second handle parts may be together for retaining the extendable pole in the position adjacent the base 20. The light source 70 may include: plural light emitting diodes operable to produce light at a plurality of levels; or an actuator that is actuatable for defining beams of light including at least a spot beam and a flood beam; or plural light emitting diodes operable to produce light at a plurality of levels and an actuator that is actuatable for defining beams of light including at least a spot beam and a flood beam.

A portable light may comprise: a generally rectangular base 20 including a source of electrical power and having a generally rectangular bottom surface configured for being placed upon a supporting surface; a light source 70 supported on a pole supported by the base 20; an electrical switch 96 connecting the light source 70 to the source of electrical power for selectively energizing the light source 70 to produce light; two deployable legs 30, 30*a*, 30*b* pivotably supported proximate adjacent corners of the base 20, the two deployable legs 30, 30*a*, 30*b* being pivotably deployable about an axis substantially perpendicular to the bottom surface of the base 20 to extend away from the base 20 in a plane substantially parallel to the bottom surface of the base 20 and adjacent to the supporting surface on which the bottom surface of the base 20 is placed when the portable light is placed on the supporting surface; and a brace 32 pivotably supported at a first end by one of the two deployable legs 30, 30*a*, 30*b* and having a second end configured for engaging a second one of the two deployable legs 30, 30*a*, 30*b*, whereby the brace 32 when engaged substantially fixes the two deployable legs 30, 30*a*, 30*b* in predetermined deployed positions relative to the base 20, whereby the two deployable legs 30, 30*a*, 30*b* when deployed and connected by the brace 32 cooperate with the bottom surface of the base 20 to define a three leg tripod-like structure for the portable light. The brace 32: may be pivotably supported by the one of the two deployable legs 30, 30*a*, 30*b*; or may be stowable in a recess in the one of the two deployable legs 30, 30*a*, 30*b*; may be pivotably supported by the one of the two deployable legs 30, 30*a*, 30*b* and may be stowable in a recess in the one of the two deployable legs 30, 30*a*, 30*b*. The second one of the two deployable legs 30, 30*a*, 30*b* may include a pin for engaging the second end of the brace 32; or the second end of the brace 32 has a hole for engaging the second one of the two deployable legs 30, 30*a*, 30*b*; or the second one of the two deployable legs 30, 30*a*, 30*b* may include a pin for engaging a hole in the second end of the brace 32. The pin may be a U-shaped pin; or the pin may be captive on the second one of the deployable legs; or the pin may be a U-shaped pin that is captive on the second one of the deployable legs. The base may have two recesses configured to receive the two deployable legs when the two deployable legs are in a stowed position; or the base may have two fasteners configured to retain the two deployable legs adjacent the base when the two deployable legs are in the stowed position; or the base may have two recesses configured to receive the two deployable legs when the two deployable legs are in the stowed position and may have two fasteners configured to retain the two deployable legs in the two recesses when the two deployable legs are in the stowed position. The pole may be an extendable pole including: a plurality of telescoping sections; or one or more clamps for maintaining the extendable pole in an extended configuration; or a plurality of telescoping sections and one or more clamps for maintaining the telescoping sections of the extendable pole in an extended configuration. The pole may be an extendable pole having a hollow interior and wherein: one or more electrical conductors disposed in the hollow interior of the extendable pole connect the source of electrical power to the light source 70; or a coil cable including one or more electrical conductors disposed in the hollow interior of the extendable pole connects the source of electrical power to the light source 70. The pole may be pivotably supported at a first end by the base 20, may further comprise: a split handle on the base 20 including separable first and second handle parts that may be pivotably attached to the base 20 to provide a handle when pivoted together, wherein the first and second handle parts may be pivotable together for retaining the pole when the pole is pivoted to be in a position adjacent the base 20 and may be pivotable apart for enabling the pole to be pivoted relative to the base 20. The portable light of claim 17 wherein the split handle may include: one or more springs for urging the first and second handle parts to move together, thereby to define the handle; or a handle pin disposable in respective openings of the first and second handle parts for retaining the first and second handle parts together, thereby to define the handle; or one or more springs for urging the first and second handle parts to move together and a handle pin disposable in respective openings of the first and second handle parts for retaining the first and second handle parts together, thereby to define the handle. The pole may be an extendable pole including a plurality of telescoping sections and one or more clamps for maintaining the telescoping sections of the extendable pole in a collapsed or an extended configuration, wherein the base 20 may include a recess shaped for receiving at least an outer one of the telescoping sections and one or more of the one or more clamps therein when the separable first and second handle parts may be together for retaining the extendable pole in the position adjacent the base 20. The portable light of claim 12 wherein the light source 70 may include: plural light emitting diodes operable to produce light at a plurality of levels; or an actuator that is actuatable for defining beams of light including at least a spot beam and a flood beam; or plural light emitting diodes operable to produce light at a plurality of levels and an actuator that is actuatable for defining beams of light including at least a spot beam and a flood beam.

A portable light 10 may comprise: a base 20 including a source of electrical power; a deployable pole 40 pivotably supported on the base 20; a light source 70 supported on the deployable pole 40; an electrical switch 96 connecting the light source 70 to the source of electrical power for selectively energizing the light source 70 to produce light; a latch assembly 80 configured to retain the deployable pole 40 in a deployed position and to release the deployable pole 40 from the deployed position at which it is retained thereby; the latch assembly 80 including a latch plate biased to move toward the deployable pole 40 to engage the deployable pole 40 when the deployable pole 40 is in the deployed position, the latch plate being movable to disengage the deployable pole 40 whereby the deployable pole 40 is released to be moved from the deployed position. The deployable pole 40 may be pivotably supported at a base end thereof on the base 20. The latch plate 82 may move into engaging relation with the deployable pole 40 when the deployable pole 40 is pivoted to an erected position relative to the base 20, the latch plate 82 being movable to release the deployable pole 40 to move away from the erected position. The deployable pole 40 may have a recess or a ridge or both a recess and a ridge that engage the latch plate 82 to retain the deployable pole 40 in the deployed position. The latch plate 82 may have an edge, wherein the bias of the latch plate 82 biases the edge thereof to move toward the recess or ridge or the recess and ridge of the deployable pole 40, wherein the edge of the latch plate 82 engages the recess or ridge or the recess and ridge of the deployable pole 40 to retain the deployable pole 40 in the deployed position. The latch plate 82 may have an actuator portion wherein moving the actuator portion of the latch plate 82 to overcome the bias of the latch plate 82 releases the deployable pole 40, whereby the deployable pole 40 is released to be movable from the deployed position. The deployable pole 40 may have a curved surface against which the latch plate 82 is biased to bear, wherein moving the deployable pole 40 to the deployed position moves the latch plate 82 against its bias until an edge of the latch plate 82 moves over the recess or ridge or the recess and ridge of the deployable pole 40 to be engaged thereby at the deployed position, whereby the deployable pole 40 is retained in the deployed position. The deployable pole 40 may be an extendable pole 40 that may include: a plurality of telescoping sections; or one or more clamps for maintaining the extendable pole 40 in an extended configuration; or a plurality of telescoping sections and one or more clamps for maintaining the telescoping sections of the extendable pole 40 in an extended configuration. The portable light 10 may further comprise: at least two deployable legs 30 being pivotably deployable to extend away from the base 20 and adjacent to a supporting surface on which a bottom surface of the base 20 is placed when the portable light is placed on the supporting surface; and a brace supported at a first end by one of the deployable legs 30 and having a second end configured for engaging a second one of the deployable legs 30, whereby the brace when engaged substantially fixes the at least two deployable legs 30 in predetermined deployed positions extending away from the base 20, whereby the at least two deployable legs 30 when deployed and connected by the brace cooperate with the bottom surface of the base 20 to define a three leg tripod-like structure for the portable light. The portable light 10 may further comprise: a split handle 60 on the base 20 may include separable first and second handle parts that are pivotably attached to the base 20 to provide a handle when pivoted together, wherein the first and second handle parts are pivotable together for retaining the deployable pole 40 when the deployable pole 40 is pivoted to be in a position adjacent the base 20 and are pivotable apart for enabling the deployable pole 40 to be pivoted relative to the base 20. The split handle 60 may include: one or more springs for urging the first and second handle parts to move together, thereby to define the handle; or a handle pin disposable in respective openings of the first and second handle parts for retaining the first and second handle parts together, thereby to define the handle; or one or more springs for urging the first and second handle parts to move together and a handle pin disposable in respective openings of the first and second handle parts for retaining the first and second handle parts together, thereby to define the handle.

A portable light 10 may comprise: a base 20 including a source of electrical power; a deployable extendable pole 40 pivotably supported at a base end thereof on the base 20; a light source 70 movably supported on an end of the deployable extendable pole 40 opposite the base end thereof; an electrical switch 96 connecting the light source 70 to the source of electrical power in the base 20 for selectively energizing the light source 70 to produce light; a latch assembly 80 supported on the base 20, the latch assembly 80 being configured to retain the deployable extendable pole 40 in a deployed position whereat the deployable extendable pole 40 is pivoted away from the base 20 and to release the deployable extendable pole 40 whereby the deployable extendable pole 40 can be pivoted from the deployed position at which it is retained by the latch assembly 80; the latch assembly 80 including a pivotable latch plate 82 and a spring to bias the pivotable latch plate 82 to pivot toward the base end of the deployable extendable pole 40 to engage the base end of the deployable extendable pole 40 when the deployable extendable pole 40 is in the deployed position, the pivotable latch plate 82 being pivotable to move away from the base end of the deployable extendable pole 40 against the spring bias to disengage the base end of the deployable extendable pole 40 whereby the deployable extendable pole 40 is released to be moved from the deployed position. The pivotable latch plate 82 may move into engaging relation with an engaging feature of the base end of the deployable extendable pole 40 when the deployable extendable pole 40 is pivoted to an erected position relative to the base 20, the pivotable latch plate 82 being movable to release the deployable extendable pole 40 to move away from the erected position. The base end of the deployable extendable pole 40 may have a recess or a ridge or both a recess and a ridge that engage the pivotable latch plate 82 when the deployable extendable pole 40 is pivoted to the deployed position thereby to retain the deployable extendable pole 40 in the deployed position. The pivotable latch plate 82 may have an edge spaced away from its pivot, and wherein the spring bias of the pivotable latch plate 82 biases the edge of the pivotable latch plate 82 to move toward the recess or ridge or the recess and ridge at the base end of the deployable extendable pole 40, wherein the edge of the pivotable latch plate 82 moves under the spring bias to engage the recess or ridge or the recess and ridge at the base end of the deployable extendable pole 40 when the deployable extendable pole 40 is pivoted to the deployed position thereby to retain the deployable extendable pole 40 in the deployed position. The pivotable latch plate 82 may have an actuator portion at an end thereof opposite to the edge thereof, wherein moving the actuator portion of the pivotable latch plate 82 in a direction to overcome the bias of the spring on the pivotable latch plate 82 releases the edge of the pivotable latch plate 82 from the recess or ridge or the recess and ridge at the base end of the deployable extendable pole 40, whereby the deployable extendable pole 40 is released to be movable from the deployed position. The base end of the deployable extendable pole 40 may have a curved surface against which the pivotable latch plate 82 is biased by the spring to bear, wherein moving the deployable extendable pole 40 to the deployed position moves the pivotable latch plate 82 against the spring bias until an edge of the pivotable latch plate 82 moves over the recess or ridge or the recess and ridge at the base end of the deployable extendable pole 40 to be engaged thereby when the deployable extendable pole 40 is at the deployed position, whereby the deployable extendable pole 40 is retained in the deployed position. The deployable extendable pole 40 may include: a plurality of telescoping sections; or one or more clamps for maintaining the deployable extendable pole 40 in an extended configuration; or a plurality of telescoping sections and one or more clamps for maintaining the telescoping sections of the deployable extendable pole 40 in an extended configuration. The portable light 10 may further comprise: at least two deployable legs 30 being pivotably deployable to extend away from the base 20 and adjacent to a supporting surface on which a bottom surface of the base 20 is placed when the portable light is placed on the supporting surface; and a brace supported at a first end by one of the deployable legs 30 and having a second end configured for engaging a second one of the deployable legs 30, whereby the brace when engaged substantially fixes the at least two deployable legs 30 in predetermined deployed positions extending away from the base 20, whereby the at least two deployable legs 30 when deployed and connected by the brace cooperate with the bottom surface of the base 20 to define a three leg tripod-like structure for the portable light. The portable light 10 may further comprise: a split handle 60 on the base 20 may include separable first and second handle parts that are pivotably attached to the base 20 to provide a handle when pivoted together, wherein the first and second handle parts are pivotable together for retaining the deployable extendable pole 40 when the deployable extendable pole 40 is pivoted to be in a position adjacent the base 20 and are pivotable apart for enabling the deployable extendable pole 40 to be pivoted relative to the base 20. The split handle 60 may include: one or more springs for urging the first and second handle parts to move together, thereby to define the handle; or a handle pin disposable in respective openings of the first and second handle parts for retaining the first and second handle parts together, thereby to define the handle; or one or more springs for urging the first and second handle parts to move together and a handle pin disposable in respective openings of the first and second handle parts for retaining the first and second handle parts together, thereby to define the handle.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such. It is noted that embodiments of very different sizes, shapes and dimensions may employ the described arrangements.

Although terms such as "up," "down," "left," "right," "up," "down," "front," "rear," "side," "end," "top," "bottom," "forward," "backward," "under" and/or "over," "vertical," "horizontal," and the like may be used herein as a convenience in describing one or more embodiments and/or uses of the present arrangement, the articles described may be positioned in any desired orientation and/or may be utilized in any desired position and/or orientation. Such terms of position and/or orientation should be understood as being for convenience only, and not as limiting of the invention as claimed.

The term battery is used herein to refer to an electrochemical device comprising one or more electro-chemical cells and/or fuel cells, and so a battery may include a single cell or plural cells, whether as individual units or as a packaged unit. A battery is one example of a type of an electrical power source suitable for a portable device. Other devices could include fuel cells, super capacitors, solar cells, and the like.

Various embodiments of a battery may have one or more battery cells, e.g., one, two, three, four, or five or more battery cells, as may be deemed suitable for any particular device. A battery may employ various types and kinds of battery chemistry types, e.g., a carbon-zinc, alkaline, lead acid, nickel-cadmium (Ni-CD), nickel-metal-hydride (NiMH) or lithium-ion (Li-Ion) battery type, of a suitable number of cells and cell capacity for providing a desired operating time for the particular device. Examples may include a six cell lead acid battery producing about 12 volts, a three cell Ni-CD battery typically producing about 3.6 volts, a four cell NiMH battery typically producing about 4.8 volts, a five cell NiMH battery producing about 6 volts, a Li-Ion battery typically producing about 3.5 volts, or a two-cell Li-Ion battery typically producing about 7 volts, it being noted that the voltages produced thereby will be higher when approaching full charge and will be lower in discharge, particularly when providing higher current and when reaching a low level of charge, e.g., becoming discharged.

The term DC converter is used herein to refer to any electronic circuit that receives at an input electrical power at one voltage and current level and provides at an output DC electrical power at a different voltage and/or current level. Examples may include a DC-DC converter, an AC-DC converter, a boost converter, a buck converter, a buck-boost converter, a single-ended primary-inductor converter (SEPIC), a series regulating element, a current level regulator, and the like. The input and output thereof may be DC coupled and/or AC coupled, e.g., as by a transformer and/or capacitor. A DC converter may or may not include circuitry for regulating a voltage and/or a current level, e.g., at an output thereof, and may have one or more outputs providing electrical power at different voltage and/or current levels and/or in different forms, e.g., AC or DC.

While the present invention has been described in terms of the foregoing example embodiments, variations within the scope and spirit of the present invention as defined by the claims following will be apparent to those skilled in the art. For example, telescoping pole 40 may have a greater or lesser number of telescoping pole sections 42 so as to provide a greater or lesser elevation of light head 70. The clamps 44 thereof may be operated by a threaded clamping device, e.g., a bolt and threaded handle, or by a cam operated clamping device, or by pins insertable to one or more sets of holes along the lengths of telescoping sections 42.

While in one embodiment of portable light 10 internal ridges of the sections 42*a*-42*e* of telescoping pole 40 constrain the relative rotation of one section 42*a*-42*e* thereof with respect to an adjacent section 42*a*-42*e* thereof, thereby to avoid either twisting coil cable 204 too tightly or too loosely, a substantial degree of rotation of light head 70 relative to telescoping pole 40 is preferably provided at pole clamp 44 a close to light head 70. In one embodiment, light head 70 is rotatable about the axis of telescoping pole 40 by about 320° or more or less, which is sufficient to direct the light from light head 70 over a wide range of directions without having to reposition base 20 on the surface on which it is placed. Greater rotation, either at light head 70 or between the sections 42*a*-42*e* of telescoping pole 40 may be provided whereby light head 70 may have 360° or greater rotational freedom in azimuth.

Alternatively to rechargeable sealed lead-acid batteries, other types of batteries, e.g., nickel-cadmium, nickel-metal hydride and lithium ion batteries, could be employed, and preferably the rechargeable types of those battery chemistries.

While certain features may be described as a raised feature, e.g., a ridge, boss, flange, projection, edge or other raised feature, such feature may be positively formed or may be what remains when a recessed feature, e.g., a groove, slot, hole, indentation, recess, opening or other recessed feature, is made. Similarly, while certain features may be described as a recessed feature, e.g., a groove, slot, hole, indentation, recess or other recessed feature, such feature may be positively formed or may be what remains after a raised feature, e.g., a ridge, boss, flange, projection or other raised feature, is made.

Each of the U.S. Provisional Applications, U.S. Patent Applications, and/or U.S. Patents, identified herein is hereby incorporated herein by reference in its entirety, for any purpose and for all purposes irrespective of how it may be referred to or described herein.

Finally, numerical values stated are typical or example values, are not limiting values, and do not preclude substantially larger and/or substantially smaller values. Values in any given embodiment may be substantially larger and/or may be substantially smaller than the example or typical values stated.

What is claimed is:

1. A portable light comprising:
    a base including a source of electrical power;
    a deployable pole pivotably supported on said base;
    a light source supported on said deployable pole;
    an electrical switch connecting said light source to the source of electrical power for selectively energizing said light source to produce light;
    a latch assembly configured to retain said deployable pole in a deployed position and to release said deployable pole from the deployed position at which it is retained thereby;
    said latch assembly including a latch plate biased to move toward said deployable pole to engage said deployable pole when the deployable pole is in the deployed position, said latch plate being movable to disengage said deployable pole whereby the deployable pole is released to be moved from the deployed position.

2. The portable light of claim 1 wherein said latch plate moves into engaging relation with said deployable pole when said deployable pole is pivoted to an erected position relative to said base, said latch plate being movable to release said deployable pole to move away from the erected position.

3. The portable light of claim 1 wherein said deployable pole has a recess or a ridge or both a recess and a ridge that engage said latch plate to retain said deployable pole in the deployed position.

4. The portable light of claim 3 wherein said latch plate has an edge, and wherein the bias of said latch plate biases the edge thereof to move toward the recess or ridge or the recess and ridge of said deployable pole, wherein the edge of said latch plate engages the recess or ridge or the recess and ridge of said deployable pole to retain said deployable pole in the deployed position.

5. The portable light of claim 3 wherein said latch plate has an actuator portion wherein moving the actuator portion of said latch plate to overcome the bias of said latch plate releases said deployable pole, whereby said deployable pole is released to be movable from the deployed position.

6. The portable light of claim 3 wherein said deployable pole has a curved surface against which said latch plate is biased to bear, wherein moving said deployable pole to the deployed position moves said latch plate against its bias until an edge of said latch plate moves over the recess or ridge or the recess and ridge of said deployable pole to be engaged thereby at the deployed position, whereby said deployable pole is retained in the deployed position.

7. The portable light of claim 1 wherein said deployable pole is an extendable pole including:
    a plurality of telescoping sections; or
    one or more clamps for maintaining said extendable pole in an extended configuration; or
    a plurality of telescoping sections and one or more clamps for maintaining the telescoping sections of said extendable pole in an extended configuration.

8. The portable light of claim 1 further comprising:
    at least two deployable legs being pivotably deployable to extend away from said base and adjacent to a supporting surface on which a bottom surface of said base is placed when said portable light is placed on the supporting surface; and a brace supported at a first end by one of said deployable legs and having a second end configured for engaging a second one of said deployable legs, whereby said brace when engaged substantially fixes said at least two deployable legs in predetermined deployed positions extending away from said base, whereby said at least two deployable legs when deployed and connected by said brace cooperate with the bottom surface of said base to define a three leg tripod-like structure for said portable light.

9. The portable light of claim 1 further comprising:
a split handle on said base including separable first and second handle parts that are pivotably attached to said base to provide a handle when pivoted together, wherein said first and second handle parts are pivotable together for retaining said deployable pole when said deployable pole is pivoted to be in a position adjacent said base and are pivotable apart for enabling said deployable pole to be pivoted relative to said base.

10. The portable light of claim 9 wherein said split handle includes:
one or more springs for urging the first and second handle parts to move together, thereby to define the handle; or
a handle pin disposable in respective openings of the first and second handle parts for retaining the first and second handle parts together, thereby to define the handle; or
one or more springs for urging the first and second handle parts to move together and a handle pin disposable in respective openings of the first and second handle parts for retaining the first and second handle parts together, thereby to define the handle.

11. A portable light comprising:
a base including a source of electrical power;
a deployable extendable pole pivotably supported at a base end thereof on said base;
a light source movably supported on an end of said deployable extendable pole opposite the base end thereof;
an electrical switch connecting said light source to the source of electrical power in said base for selectively energizing said light source to produce light;
a latch assembly supported on said base, said latch assembly being configured to retain said deployable extendable pole in a deployed position whereat said deployable extendable pole is pivoted away from said base and to release said deployable extendable pole whereby the deployable extendable pole can be pivoted from the deployed position at which it is retained by said latch assembly;
said latch assembly including a pivotable latch plate and a spring to bias the pivotable latch plate to pivot toward the base end of said deployable extendable pole to engage the base end of said deployable extendable pole when the deployable extendable pole is in the deployed position, said pivotable latch plate being pivotable to move away from the base end of said deployable extendable pole against the spring bias to disengage the base end of said deployable extendable pole whereby the deployable extendable pole is released to be moved from the deployed position.

12. The portable light of claim 11 wherein said pivotable latch plate moves into engaging relation with an engaging feature of the base end of said deployable extendable pole when said deployable extendable pole is pivoted to an erected position relative to said base, said pivotable latch plate being movable to release said deployable extendable pole to move away from the erected position.

13. The portable light of claim 11 wherein the base end of said deployable extendable pole has a recess or a ridge or both a recess and a ridge that engage said pivotable latch plate when the deployable extendable pole is pivoted to the deployed position thereby to retain said deployable extendable pole in the deployed position.

14. The portable light of claim 13 wherein said pivotable latch plate has an edge spaced away from its pivot, and wherein the spring bias of said pivotable latch plate biases the edge of said pivotable latch plate to move toward the recess or ridge or the recess and ridge at the base end of said deployable extendable pole, wherein the edge of said pivotable latch plate moves under the spring bias to engage the recess or ridge or the recess and ridge at the base end of said deployable extendable pole when said deployable extendable pole is pivoted to the deployed position thereby to retain said deployable extendable pole in the deployed position.

15. The portable light of claim 13 wherein said pivotable latch plate has an actuator portion at an end thereof opposite to the edge thereof, wherein moving the actuator portion of said pivotable latch plate in a direction to overcome the bias of the spring on the pivotable latch plate releases the edge of said pivotable latch plate from the recess or ridge or the recess and ridge at the base end of the deployable extendable pole, whereby said deployable extendable pole is released to be movable from the deployed position.

16. The portable light of claim 13 wherein the base end of said deployable extendable pole has a curved surface against which said pivotable latch plate is biased by the spring to bear, wherein moving said deployable extendable pole to the deployed position moves said pivotable latch plate against the spring bias until an edge of said pivotable latch plate moves over the recess or ridge or the recess and ridge at the base end of said deployable extendable pole to be engaged thereby when said deployable extendable pole is at the deployed position, whereby said deployable extendable pole is retained in the deployed position.

17. The portable light of claim 11 wherein said deployable extendable pole includes:
a plurality of telescoping sections; or
one or more clamps for maintaining said deployable extendable pole in an extended configuration; or
a plurality of telescoping sections and one or more clamps for maintaining the telescoping sections of said deployable extendable pole in an extended configuration.

18. The portable light of claim 11 further comprising:
at least two deployable legs being pivotably deployable to extend away from said base and adjacent to a supporting surface on which a bottom surface of said base is placed when said portable light is placed on the supporting surface; and
a brace supported at a first end by one of said deployable legs and having a second end configured for engaging a second one of said deployable legs, whereby said brace when engaged substantially fixes said at least two deployable legs in predetermined deployed positions extending away from said base,
whereby said at least two deployable legs when deployed and connected by said brace cooperate with the bottom surface of said base to define a three leg tripod-like structure for said portable light.

19. The portable light of claim 11 further comprising:
a split handle on said base including separable first and second handle parts that are pivotably attached to said base to provide a handle when pivoted together, wherein said first and second handle parts are pivotable together for retaining said deployable extendable pole when said deployable extendable pole is pivoted to be in a position adjacent said base and are pivotable apart for enabling said deployable extendable pole to be pivoted relative to said base.

20. The portable light of claim 19 wherein said split handle includes:
one or more springs for urging the first and second handle parts to move together, thereby to define the handle; or
a handle pin disposable in respective openings of the first and second handle parts for retaining the first and second handle parts together, thereby to define the handle; or
one or more springs for urging the first and second handle parts to move together and a handle pin disposable in respective openings of the first and second handle parts for retaining the first and second handle parts together, thereby to define the handle.

\* \* \* \* \*